United States Patent [19]
Tanimoto et al.

[11] Patent Number: 5,466,913
[45] Date of Patent: Nov. 14, 1995

[54] BREAD MAKING APPARATUS AND ITS TEMPERATURE CONTROL METHOD

[75] Inventors: Toshinobu Tanimoto; Yoshikatsu Okamoto; Shinji Yoshida; Yasumasa Hironaka, all of Daito, Japan

[73] Assignee: Funai Electric Co., Ltd., Daito, Japan

[21] Appl. No.: 975,865

[22] Filed: Nov. 13, 1992

[30] Foreign Application Priority Data

Nov. 15, 1991 [JP] Japan .................... 3-300044
Jul. 10, 1992 [JP] Japan .................... 4-207222
Aug. 12, 1992 [JP] Japan .................... 4-237678

[51] Int. Cl.$^6$ .................................. H05B 1/02
[52] U.S. Cl. .................. 219/492; 219/497; 219/507; 99/328; 99/468; 99/348
[58] Field of Search .................. 219/492, 494, 219/497, 507–509, 486, 501, 493; 99/328, 325, 327, 468, 329, 332, 348

[56] References Cited

U.S. PATENT DOCUMENTS

| | | | |
|---|---|---|---|
| 4,223,207 | 9/1980 | Chow | 219/494 |
| 4,362,924 | 12/1982 | Story et al. | 219/497 |
| 4,365,289 | 12/1982 | Small et al. | 364/143 |
| 4,777,350 | 10/1988 | Crockett et al. | 219/497 |
| 4,885,176 | 12/1989 | Nakakura et al. | 426/19 |
| 4,984,512 | 1/1991 | Takahashi et al. | 99/327 |
| 5,043,560 | 8/1991 | Masreliez | 219/497 |

Primary Examiner—Mark H. Paschall
Attorney, Agent, or Firm—Lackenbach Siegel Marzullo Aronson & Greenspan

[57] ABSTRACT

In a temperature controlling method of a kitchen-heating apparatus having a temperature sensor at a certain place in the heating area, the temperature control is performed by comparing a temperature detected by the temperature sensor with a set temperature. In this case, an acceleration of the temperature ascent and descent at each certain interval is required and the temperature of the above heating portion is controlled with a duty ratio which corrects the duty ratio of the above heating portion of each interval with the acceleration of the temperature ascent and descent in the front step. In another temperature control method, the point of time where the ascent of the sensor detecting temperature due to the heater being on turns to descend together with a time lag due to the heater being off is detected, and performs the control again by turning the heater on at an earlier point of time than the point where at least the sensor detecting temperature comes down to the set value of the sensor detecting temperature.

9 Claims, 21 Drawing Sheets

FIG. 11

| TEMPERATURE | VOLTAGE | DIGITAL VALUE |
|---|---|---|
| 200 | 0.5524 | 1C |
| 201 | 0.5423 | 1C |
| 202 | 0.5323 | 1B |
| 203 | 0.5225 | 1B |
| 204 | 0.5130 | 1A |
| ⁓ | ⁓ | ⁓ |
| 213 | 0.4352 | 16 |
| 214 | 0.4274 | 16 |
| 215 | 0.4198 | 15 |
| 216 | 0.4123 | 15 |
| 217 | 0.4050 | 15 |
| | 0.3978 | 16 |

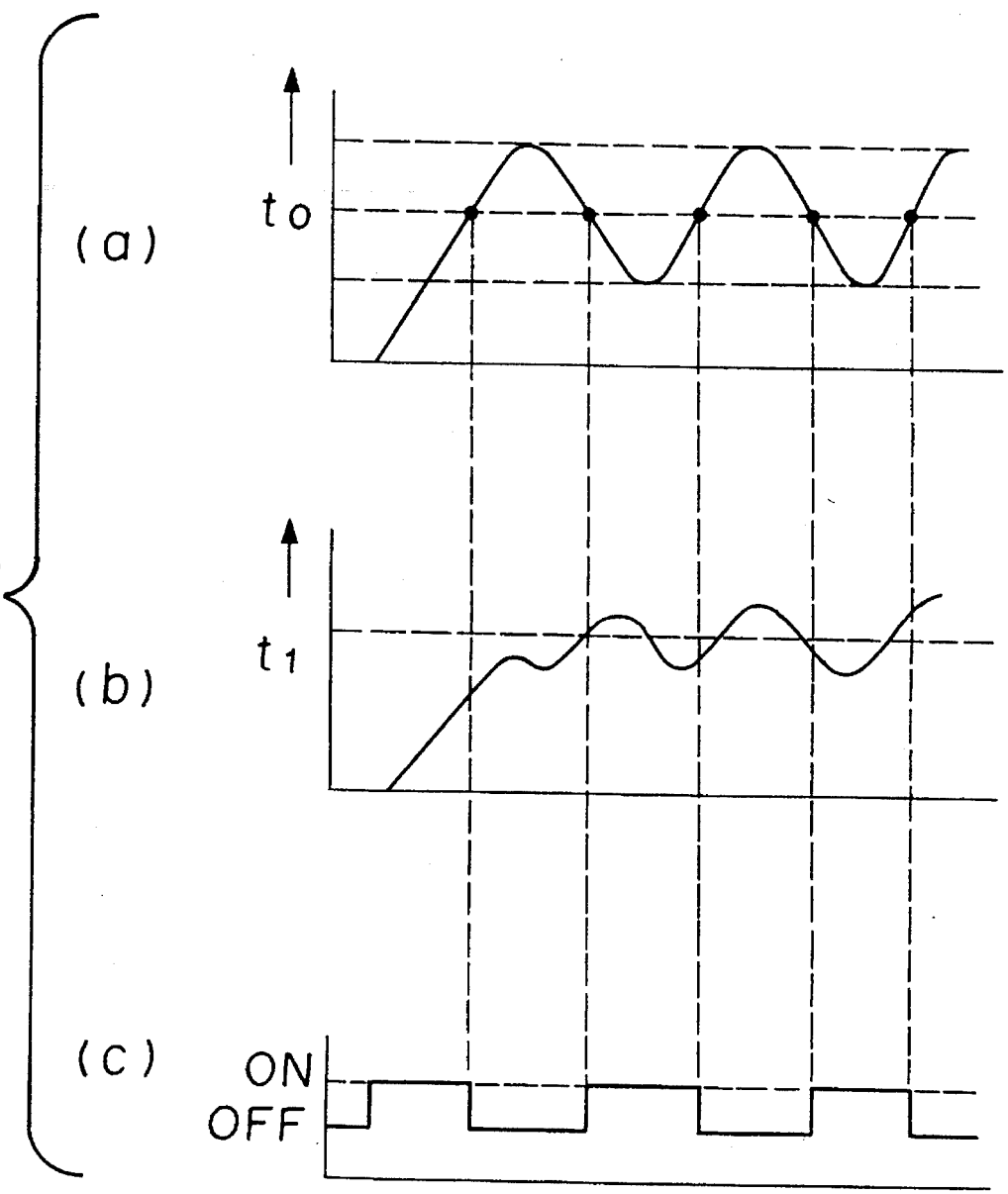

BREAD MAKING APPARATUS AND ITS TEMPERATURE CONTROL METHOD

BACKGROUND OF THE INVENTION

This invention relates to a bread making apparatus and its temperature control method suitable for a heat cooking apparatus including oven ranges and the like.

FIG. 17 is a plan view which shows the structure of an operation panel surface of a bread baking apparatus disclosed in a Gazette, U.M. Laid Open No. Hei-1 (1989)-108232. In the Figures, 51 is a main body case, and 52 is an operation panel. This operation panel 52 has a menu switch 53 which selects the kind of bread such as regular bread, french bread and the like, pre-engaged switches 54, 55 which set the baking time for the bread, a reset switch for cancelling the initial setting of these baking times, a start switch 56 for initiating bread baking, an indicator 58 which indicates time and errors, and a control dial 59 for controlling the bread baking state. The numeral 60 is an indicator lamp arranged at an upper portion of the operation panel 52 and indicates the kind of bread selected by the menu switch 53 and the completion of each process.

FIG. 18 is a sectional view which shows the inner construction of the bread making apparatus. In FIG. 18, 61 is a support legs, 62 is an upper portion case, 63 is a lid which opens and closes freely, 64 is a stand frame, 65 is a bearing plate, 66 is an inner case, 67 is an oven heater, 68 is a bread baking case, 69, 70 are a couple of latching pieces and 71 is a stand plate.

Further, 72 is a bearing portion, 73 is a metal, 74 is an upper rotation axis, 75 is a stirring motor, 76 is a belt, 77, 78 are pulleys, 79 is an outlet axis of the stirring motor 75, 80 is a lower rotation axis, 81, 82 are clutch bodies and 83 is a stirring blade.

The numeral 84 is a glass window, 85 is a heat-reflecting plate, 86 is an air absorption guide, 87 is an air absorption hole, 88 is a air blow guide, 89 is a blower fan, 90 is a countercurrent preventive plate, 91 is a sensor for mixed bread ingredients, 92 is a heat insulator, 93 is an oven sensor fixed in an inner case 66, and 94 is a wind-blowing motor.

FIG. 19 is a circuit view which shows the structure of a control circuit of the bread making apparatus. In FIG. 19, the same or the corresponding portions as FIG. 17 and FIG. 18 are shown with the same marks. In FIG. 19, 101 is a transfer switch for exchanging the dough sensor with the oven sensor 93, 102 is an integrator, 103 is a comparator circuit, 104 is a thermostat, 105 is a voltage-watching circuit, 106 is an instantaneous watching timer and 107 is a microcomputer. This microcomputer 107 is composed of RAM and ROM, and also of I/O port and A/D convertor. The ROM stores a standard program and other necessary data for bread making.

The numeral 108 is a converter for inputting the heater current of the oven heater 67 into a microcomputer 107, 109 is a relay circuit for the on/off functions of the heater current of the oven heater 67, and 110 is a triac which controls the heater current of the oven heater 67. The numeral 111 is an amplification circuit, and 112 is a speaker which gives off an alarm. The numeral 113 is a relay circuit for controlling the blower motor which controls the on/off functions of the blower motor 94 and 114 is a relay circuit for the stirring motor control which controls the on/off functions of the stirring motor 75.

FIG. 20 is a timing chart which shows a sequence of action of the bread making apparatus.

This bread making apparatus can produce bread by putting the bread ingredients in the baking case 68, then sequentially kneading or stirring and fermenting by the sequence shown in FIG. 20, and baking. Further, when the bread is being produced, each time step in the timing chart shown in FIG. 20 is adapted to be changeable by using a menu switch and preengaged switches 54, 55 for setting the bread baking times from the outside, whereby bread suited to one's individual taste can be made.

In the conventional bread making apparatus, the set temperature during the bread baking step is initially set with no consideration for the temperature outside the apparatus. As a result, when bread is baked consecutively a number of times, the problem that arises is that the quality of the first bread baked is different from the second and third ones. This is because the temperature of the oven heater 67 during the baking step becomes altered according to the temperature of the bread making apparatus itself, the retained temperature inside the bread baking case 68, and the temperature of the room wherein the bread making apparatus is placed.

This invention is intended to remove such problems and its objective is to provide a bread making apparatus which can produce bread having stable quality not influenced by the number of times the apparatus is consecutively used, the temperature of the bread making apparatus itself, the retained temperature of the bread baking case 68, or the temperature of the room wherein the bread making apparatus is placed.

A temperature control method of the bread making apparatus according to the conventional technique will be described as follows.

Namely, as shown in FIG. 18, a baking oven which bakes the kneaded dough with water is used together with a kneading container having stirring blades 83 at the bottom thereof, and at the lower outer circumference of this baking oven, an oven heater 67 is arranged.

Temperature control of this baking oven is performed by detecting it indirectly with an oven sensor 93 of a thermistor or the like fixed at an outer wall of an accommodated case of the baking oven. The numeral 75 is a driving motor for kneading blades.

Temperature data detected by the oven sensor 93 is incorporated by the control device containing a microcomputer therein, said control device keeping the heater "on" until the incorporated temperature reaches a certain set temperature in order to obtain the desired inner object temperature $T_1$ of the baking oven at the time of bread baking. When the temperature reaches the set temperature, the heater turns "off", and the inner temperature of the baking oven then continues to rise with a time lag by the remaining heat. Since the heater is already "off", the inner temperature of the baking oven begins to fall and when the temperature detected by sensor reaches the set temperature $t_0$ again, the heater is turned "on". In other words the heater is set "on" or "off" by taking the set temperature $t_0$ as a standard. The set temperature $t_0$ is the temperature which brings the inner temperature of the baking oven to the desired temperature $T_1$ (e.g., 150°) and is in general set at a slightly higher temperature (e.g., 180°).

The above illustrated control is shown in FIG. 22.

Namely, (a) in FIG. 22 shows a change in detected value of the oven sensor 93, (b) shows the water level of the temperature in the practical baking oven, and (c) shows the on/off switching time of the heater 67.

As is clear from (a) and (c) in FIG. 22, when the detected value of the oven sensor 93 after the heater 67 comes "on"

reaches the set temperature $T_0$ memorized in the control unit, the heater 67 is turned "off" by the control unit. Since the temperature in the case continues to rise for a while even with the heater off, the detected value of the oven sensor 93 also continues to rise for a while, and then comes down.

When the detected value of the oven sensor 93 reaches the set temperature $t_0$ again by the continued descent of the temperature, the heater 67 turns "on" again and heating is initiated. Although the descent of the detected value of the oven sensor continues for a while, its value begins again to rise before long.

After this, the same control is performed. As described above, in the conventional temperature control, since the heater 67 turns on or off, respectively, when the detected value of the oven sensor 93 crosses the set value $t_0$, the practical inner temperature results in considerable variation with respect to the objective value $T_1$ by all means and is unstable as shown in FIG. 22(*b*).

This invention provides a novel control method which decreases the breadth of the temperature variation in the kitchen case to as low a variation as possible.

BRIEF DESCRIPTION OF THE INVENTION

The bread making apparatus according to this invention is characterized by the fact that in a bread making apparatus provided with a bread baking case and an oven heater which consecutively performs kneading, fermentation, and baking by putting dough therein, said bread making apparatus is provided with an on/off detecting means which detects the on/off cycle of the heater, and a baking time control means which automatically controls the time of the baking steps based on the on/off information detected by the on/off cycle detecting means.

Since the bread making apparatus of this invention automatically controls the set temperature during the baking steps of the bread based on the detected on/off cycle information after detecting the on/off cycle of the current flow of the oven heater, bread having a stable quality can be obtained without being influenced by consecutive bread making, the temperature of the bread making apparatus itself, the retained heat inside the bread baking case of the bread baking apparatus, or the temperature of the room wherein the bread making apparatus is placed.

For this purpose, in this invention, a temperature sensor is provided at a certain place of the heating area and the temperature control for the heat portion of the kitchen heating apparatus is performed by comparing the temperature detected by the above temperature sensor with the set temperature. Accordingly, this invention is characterized in that an acceleration of ascending and descending temperatures of each certain interval is required and a duty ratio of the above heat portion of each interval controls the temperature of the above heat portion with a duty ratio corrected by the acceleration of each ascending and descending temperature in each front step thereof.

According to the method of this invention, in the temperature control method of the kitchen heating apparatus which controls temperature at the heat portion thereof comparing the temperature detected by a temperature sensor provided at a certain place in the heating area with the set temperature value, an acceleration of the ascending and descending temperatures at every interval is required. The duty ratio of the above heating portion at each interval controls the temperature of the above heating portion with a duty ratio corrected by the acceleration of the ascending and descending temperature at each front step. Accordingly, the kitchen temperature remains stable and uneven baking and scorching is decreased.

Another temperature control method of this invention proposes that by detecting the point in time where a rise in temperature detected by the sensor due to the heater being "on" begins to descend again together with a time lag due to the heater being "off", a point of time, rear point of the above point of time and is a front point where at least the sensor detecting temperature falls down to the set value of the sensor, detecting temperature equivalent to the objective value of the inner temperature of the kitchen place turns heater on. The above heater turning-on may be performed soon after the sensor begins to descend again together with a time lag. Further, the current flow state of the heater when the heater is on again is an intermittent "on" state which alternately repeats on/off is also performed.

BRIEF DESCRIPTION OF THE DRAWINGS

FIG. 11 is a view which shows a table in a microcomputer.

FIG. 22 is an explanatory view which shows a temperature control method of the conventional embodiment.

DETAILED DESCRIPTION OF THE INVENTION

Figure 17:
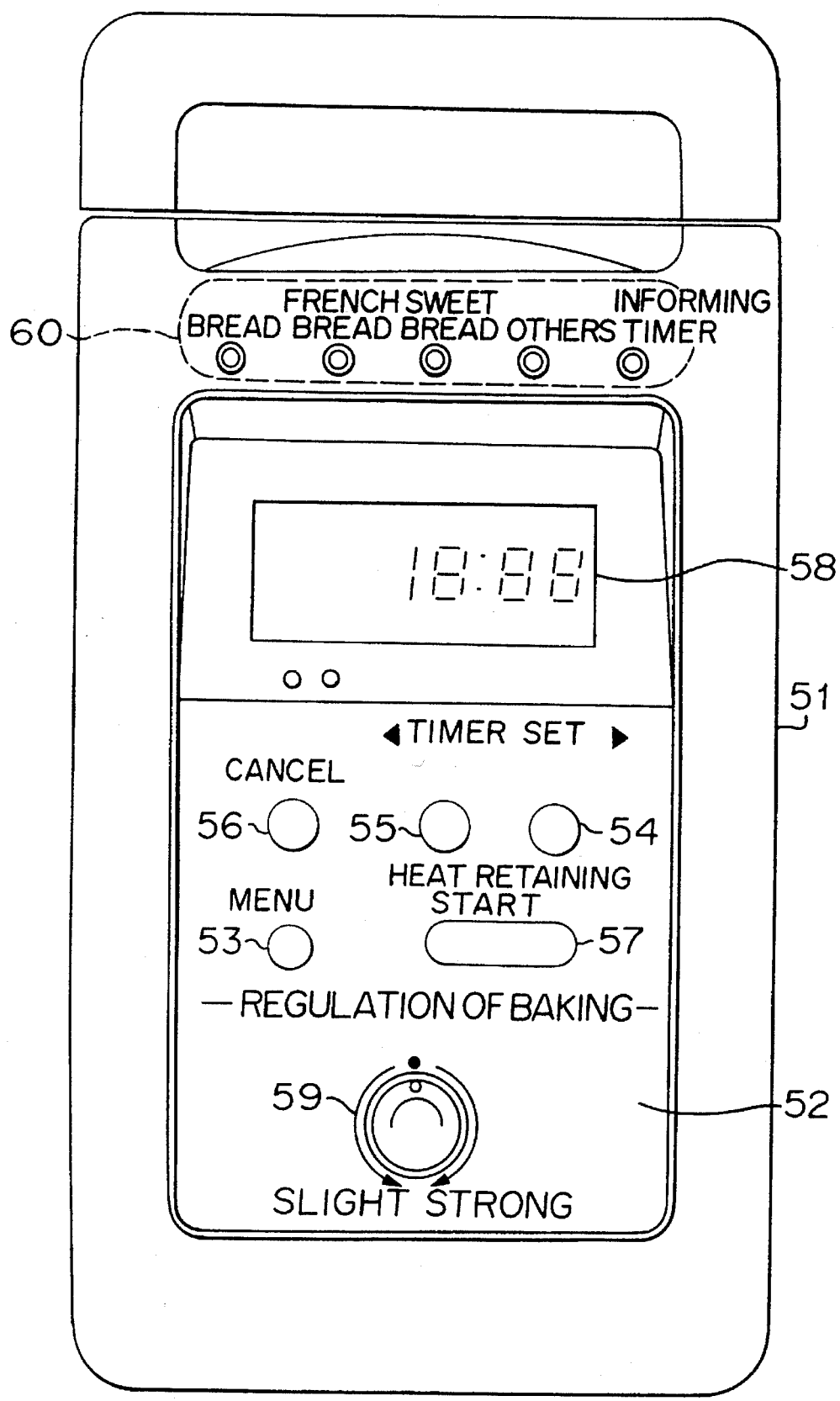
FIG. 17 is a plan view which shows a construction of an operation panel surface of the bread making apparatus disclosed in the gazette U.M. Laid Open No. Hei-1(1989)-108232.
Figure 18:
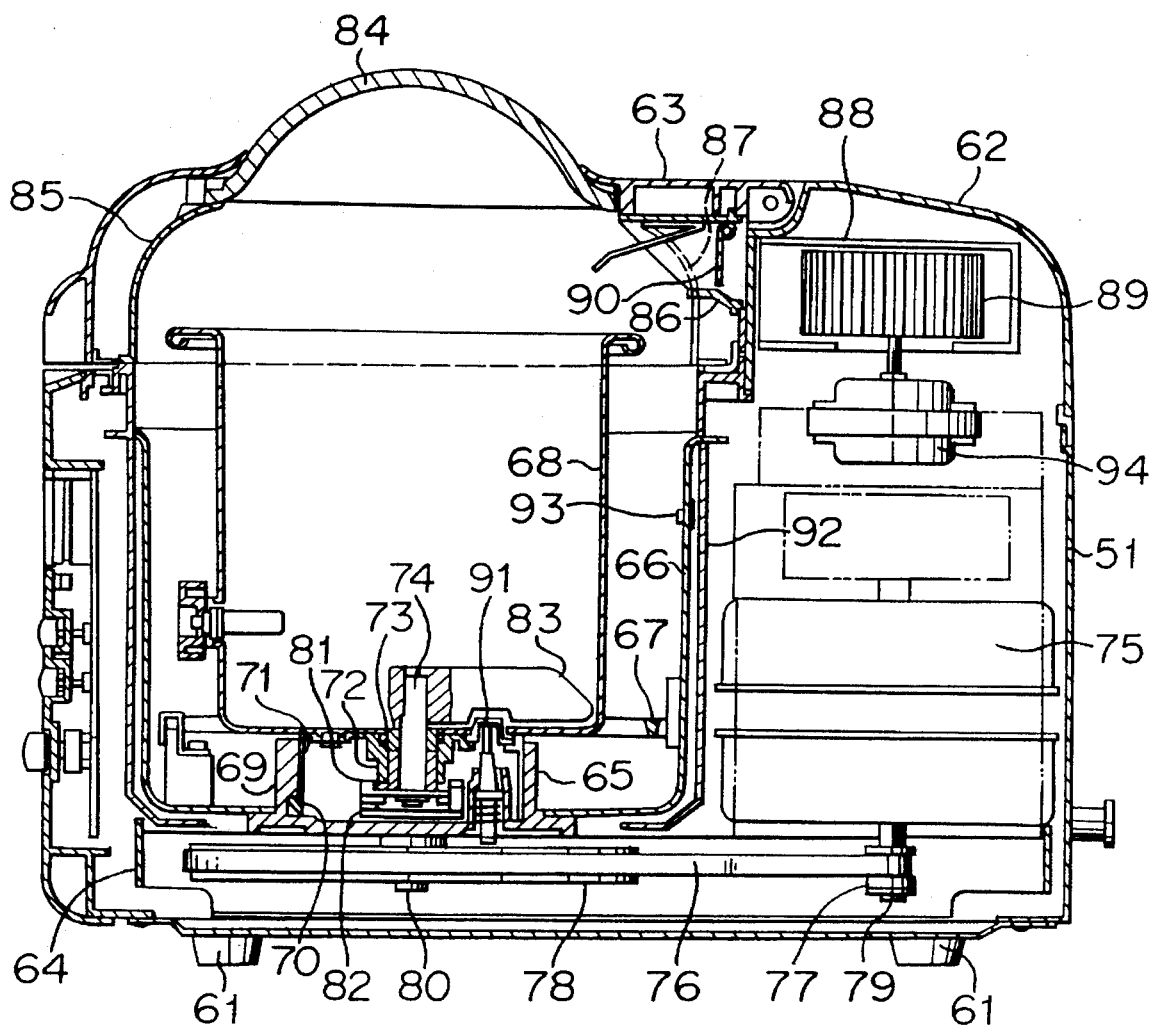
FIG. 18 is a sectional view which shows the inner construction of the bread making apparatus disclosed in gazette U.M. Laid Open No. Hei-1(1989)-108232.
Figure 19:
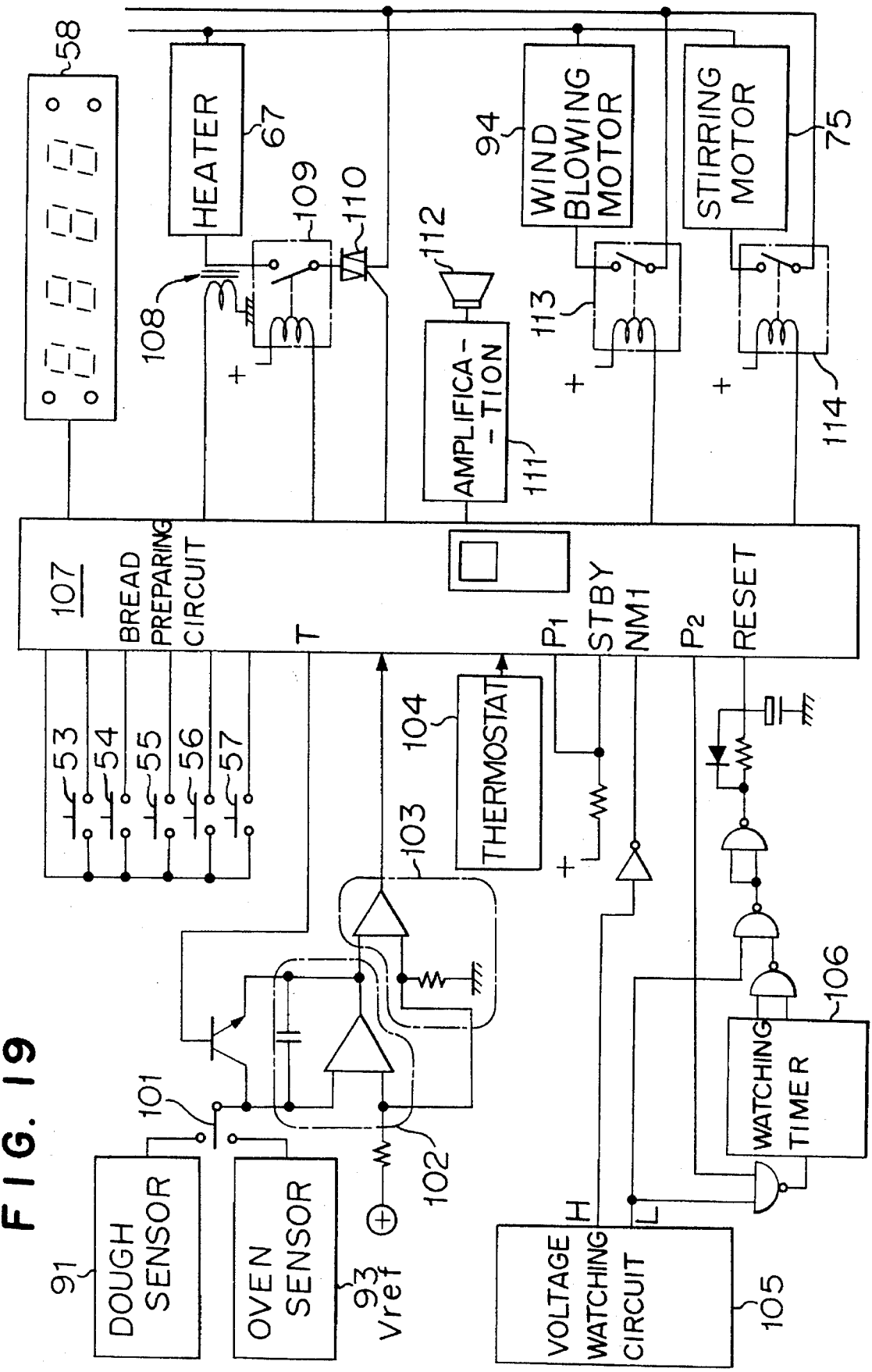
FIG. 19 is a circuit view which shows a control circuit of the bread making apparatus disclosed in a gazette U.M. Laid Open No. Hei-1(1989)-108232.
Figure 20:
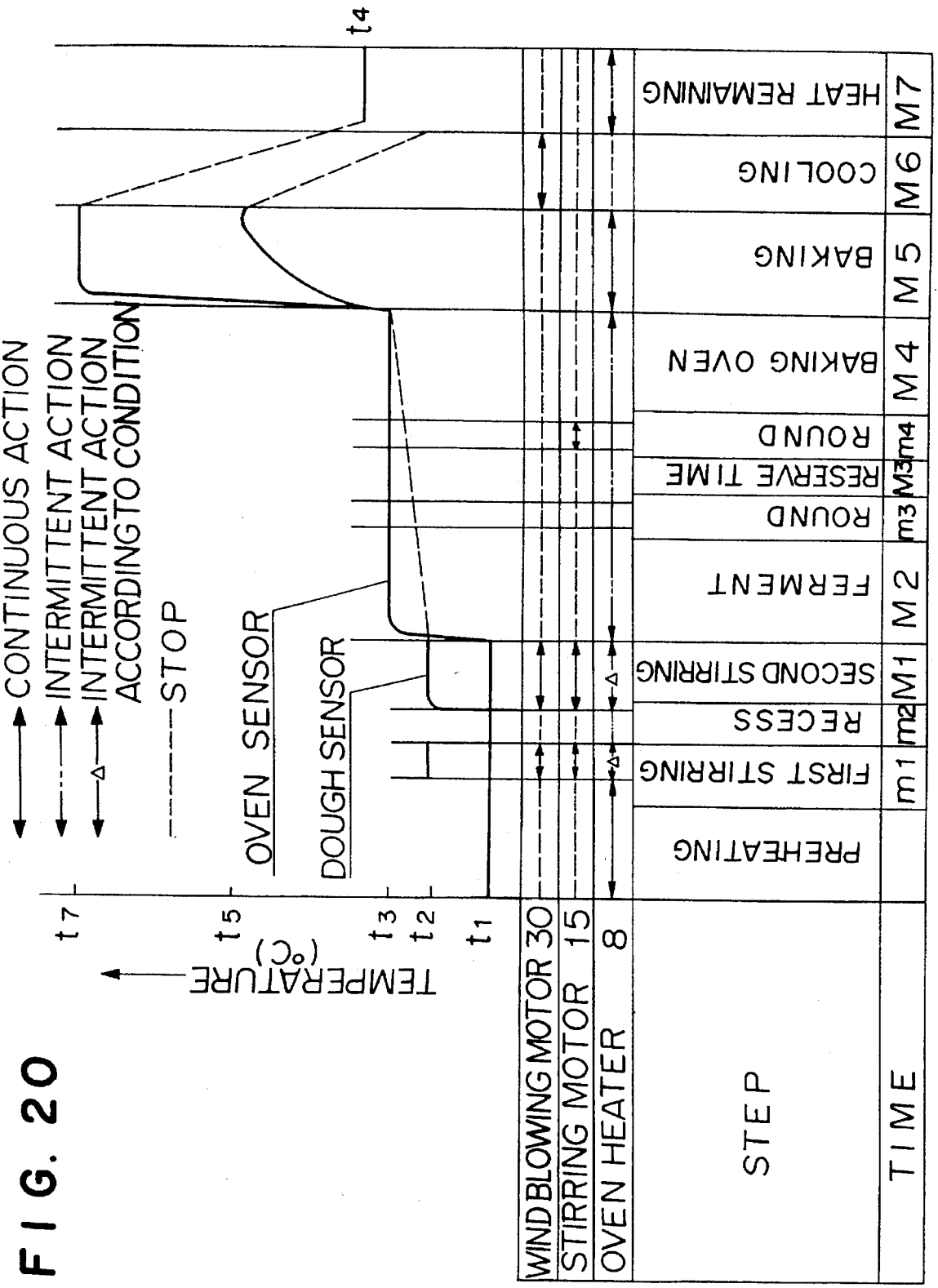
FIG. 20 is a timing chart which shows an action sequence of the bread making apparatus disclosed in a gazette U.M. Laid Open No. Hei-1(1989)-108232.
Figure 21:
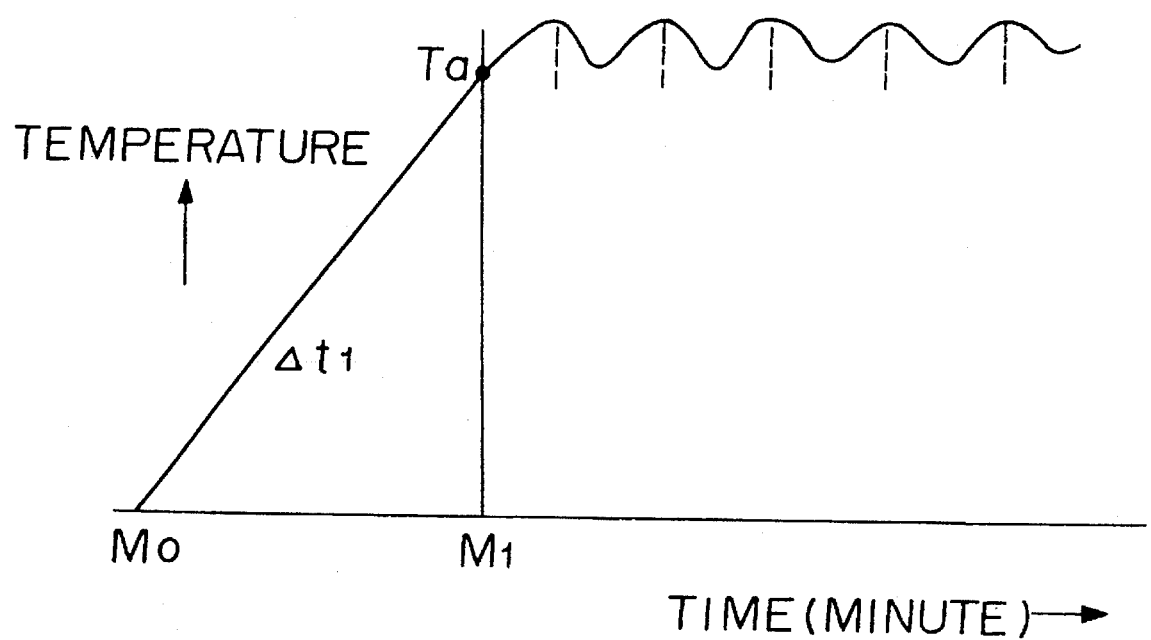
FIG. 21 is a temperature characteristic diagrammatical view of the conventional embodiment.

An embodiment of the bread making apparatus of this invention will be described as follows. Since the construction of the surface of the operation panel of the bread making apparatus in this embodiment is the same as in FIG. 17, the description thereof is abbreviated. Further, since the inner construction of the bread making apparatus is also the same as FIG. 18, the description thereof is also abbreviated.

Figure 1:
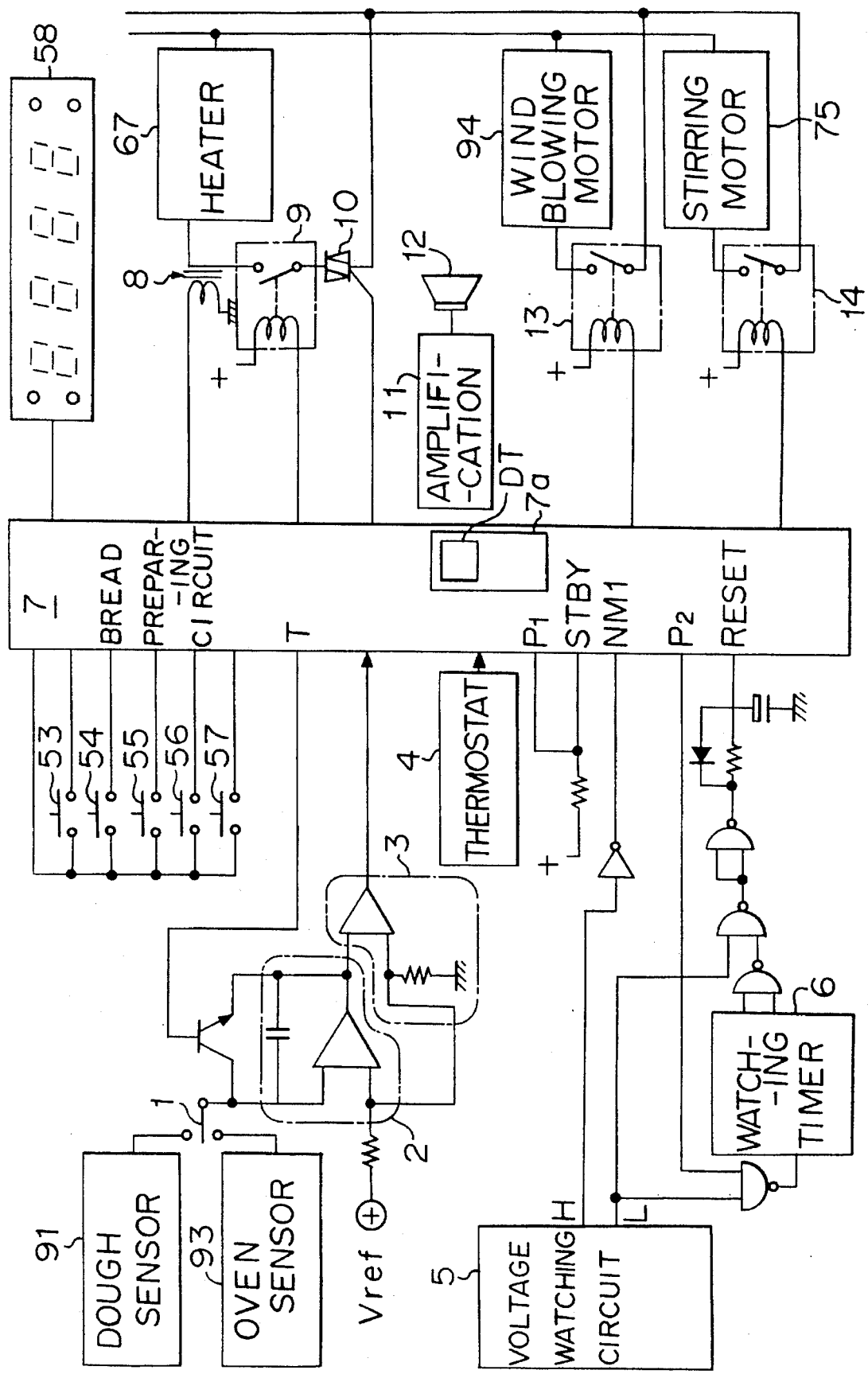
FIG. 1 is an electric circuit which shows a structure of an embodiment of the bread making apparatus of this invention.

FIG. 1 is an electric circuit view which shows the structure of an embodiment of the bread making apparatus of this invention.

Figure 2:
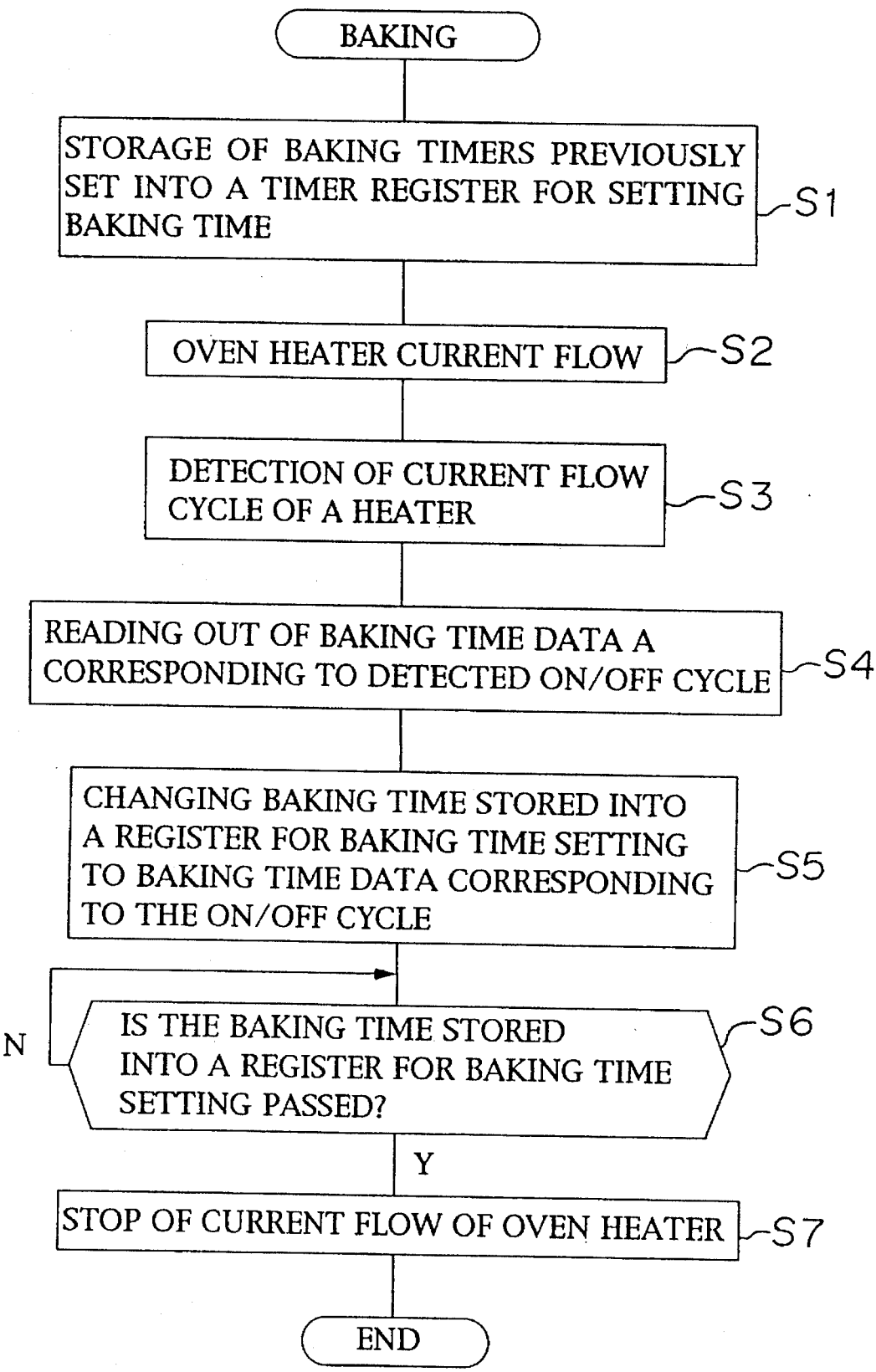
FIG. 2 is a flow chart which shows an oven heater control program for controlling the oven heater in the baking steps of bread making apparatus of an embodiment according to this invention.

In FIG. 1 is a changeover switch which changes a dough sensor 91 and an oven sensor 93, 2 is an integrator, 3 is a comparator circuit, 4 is a thermostat, 5 is a voltage watching circuit, 6 is an instantaneous watching timer, and 7 is a microcomputer. This microcomputer consists of RAM, or ROM 7a, I/O port or A/D converter, and ROM 7a stores a sequence program which shows the step order during bread making, a data table DT such as a standard basic step time data in each step and an oven heater control program as shown in FIG. 2.

The numeral 8 is a transformer which inputs the electric current of the heater of the oven heater 67 to the microcomputer 7, 9 is a relay circuit for the on/off functions of the electric current of the heater of the oven heater 67, 10 is a triac for controlling the electric current of the heater of the oven heater.

The numeral 11 is an amplification circuit, and 12 is a speaker which emits a warning. The numeral 13 is a relay circuit for controlling the ventilation motor which controls the on/off functions of the ventilation motor 94, and 14 is a relay circuit for controlling the stirring motor which controls the on/off functions of the stirring motor 75.

Next, a control action of the oven heater 67 in the baking step of the bread making apparatus will be described according to the flow chart shown in FIG. 2. First, the baking time previously set as a step time of the baking process is stored in a register for the setting of baking time not shown in the microcomputer (step S1). Then, electricity to the oven heater is turned on by the relay circuit and the triac 10 (step S2). In this case, the relay circuit 9 performs the on/off control according to the oven temperature detected by the oven sensor 93 and the set temperature previously set so that the oven temperature will agree with the set temperature. On the other hand, the triac 10 performs a phase control of the current flow through the oven heater 67 by the instruction of the microcomputer 7.

Then, the on/off cycle of the oven heater 67 is detected (step S3).

Figure 4:
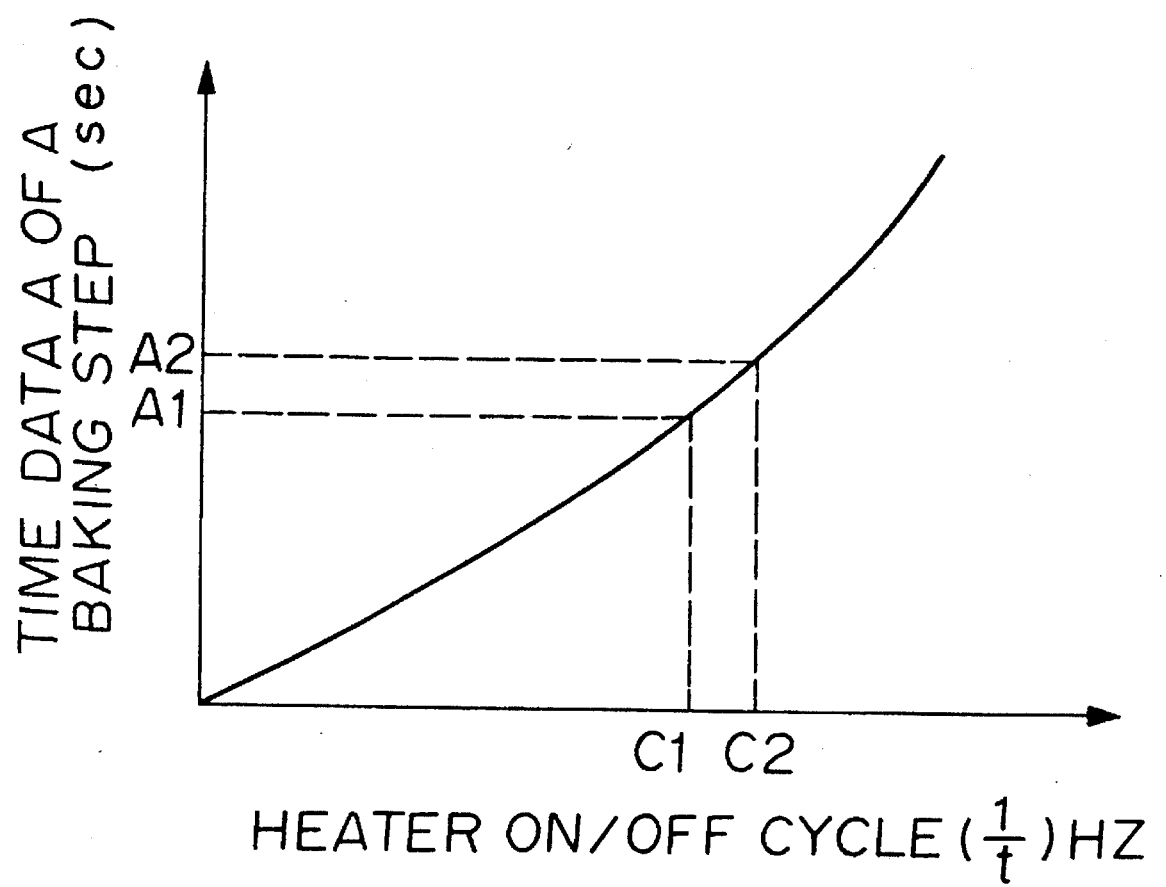
FIG. 4 is an explanatory view which shows a data table DT.

The detection of this on/off cycle is performed by the transformer 8. Based upon this detected on/off cycle information, a correspondent baking step time data A is read by reference to the data table stored in the ROM 7a. FIG. 4 is an explanatory view which shows this data table DT. When the detected on/off cycle information is C1 the baking step time data read from the data table DT is rewritten A1, and when the detected on/off cycle data information is C2, the baking step time data A1 read from the data table DT is rewritten to A2 (step S5). Further, whether or not the prescribed baking step time has passed is judged by this baking step time data A1 (step 6).

Figure 3:
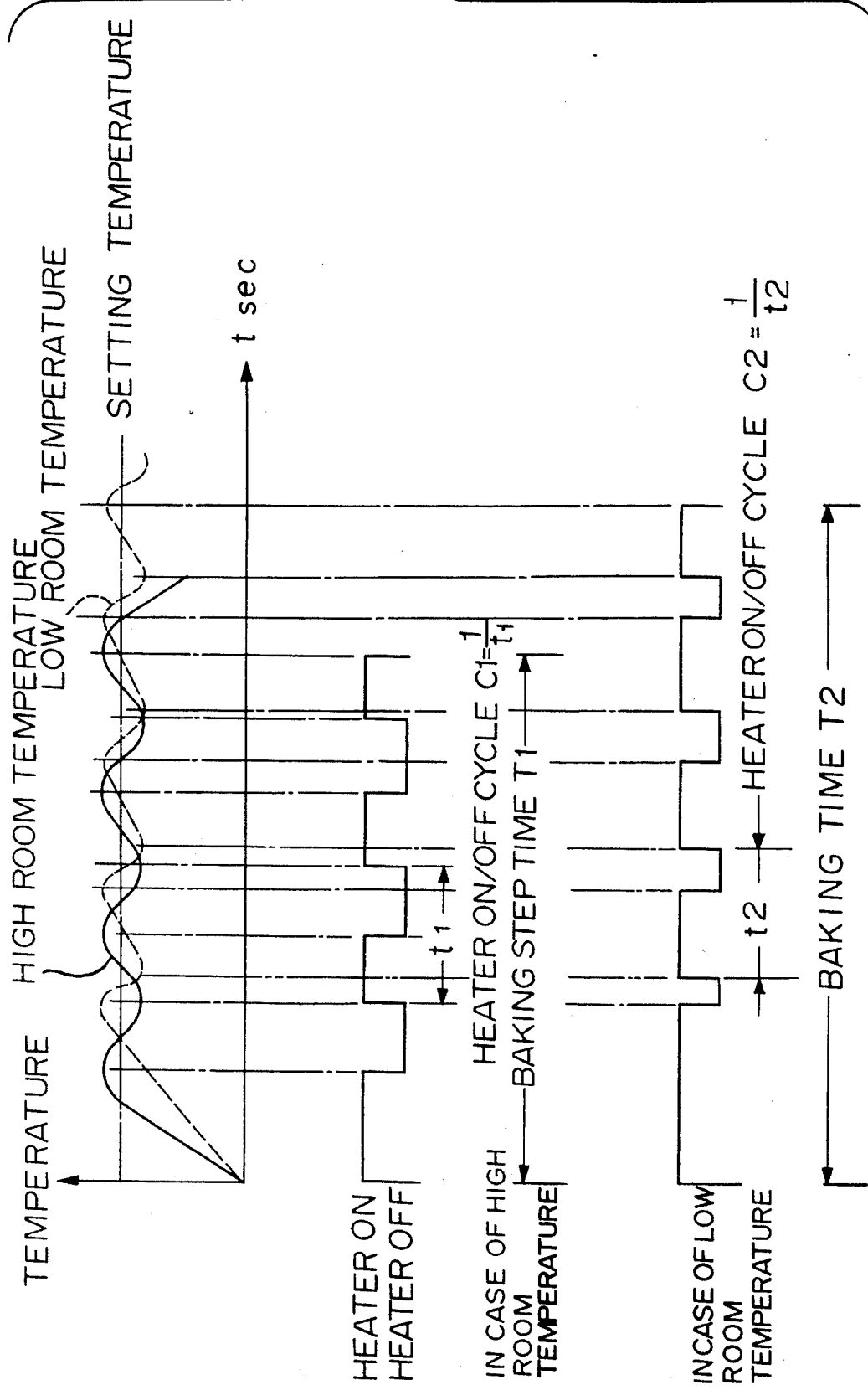
FIG. 3 is a view which shows a typical on/off action of an oven heater in the baking step of the bread making apparatus of an embodiment of this invention.

Namely, when the room temperature is high as shown in FIG. 3, the on/off cycle of the detected oven heater 67 is C1, and baking step time at this time is A1. On the other hand, when the room temperature is low, since the on/off cycle of the detected oven heater 67 is C2, the baking step time at this time is A2. Thus, when the room temperature becomes higher, the baking step time becomes shorter, and when the room temperature becomes lower, the baking step time becomes longer. In step 6, when the baking step time is judged to be passed, the current flowing through the oven heater 67 is stopped and the baking step is completed (step S7).

The relation between the on/off cycle of the detected oven heater 67 and the baking step time is regulated by the pattern of the data table DT illustrated in FIG. 4, and the relation between the on/off cycle of the detected oven heater 6 and the baking step time is considered to have several patterns.

As described above, according to this invention, the on/off cycle of the current flowing through the oven heater is detected and since the baking step time at the time of bread making is automatically controlled based upon the detected on/off cycle information, the final quality of the bread is not influenced by consecutive baking, the temperature of the bread itself, the heat retained in the inner bread baking case of the bread making apparatus or the temperature of the room wherein the bread making apparatus is placed and bread having a consistent quality can be obtained.

Next, the temperature control method of the bread making apparatus according to this invention will be described as follows.

The bread making apparatus (FIG. 5) is composed as follows.

At an upper portion of the bread making apparatus 201, a dome type lid 202 made of transparent glass is disposed so as to open and close freely. A bread case 203 is disposed at the central portion of the bread making apparatus 201. The numeral 205 shows the bread and 206 is a fixed rod for preventing the adhesion of the ingredients to the kneading blade 204 at the time of kneading. The numeral 207 is a heater provided at the lower portion around the bread case 203.

At the outside of the bread case, an inner case 208 is disposed whereby air is sent to the inner side of the inner case 208 through a ventilation duct 209. After the bread is baked, the air is sent from a ventilation fan 210 at the time of rapid cooling.

The numeral 211 is a motor which rotates the blade for kneading through pulleys 212, 213 and a belt 214. The numeral 215 is a rotational axis, and 216 is a temperature sensor.

Figure 5:
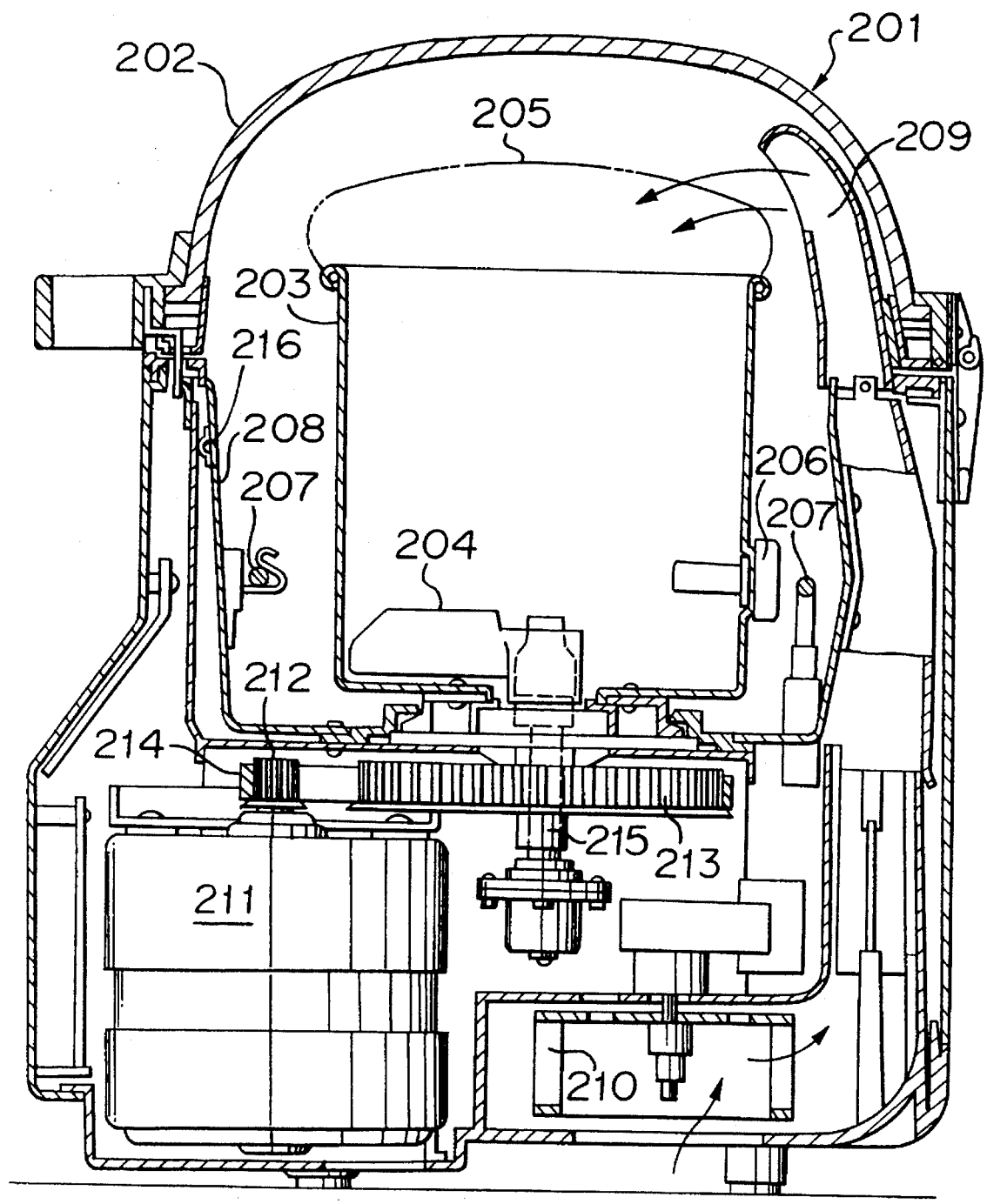
FIG. 5 is an elevation view of a bread making apparatus of an embodiment in this invention.
Figure 6:
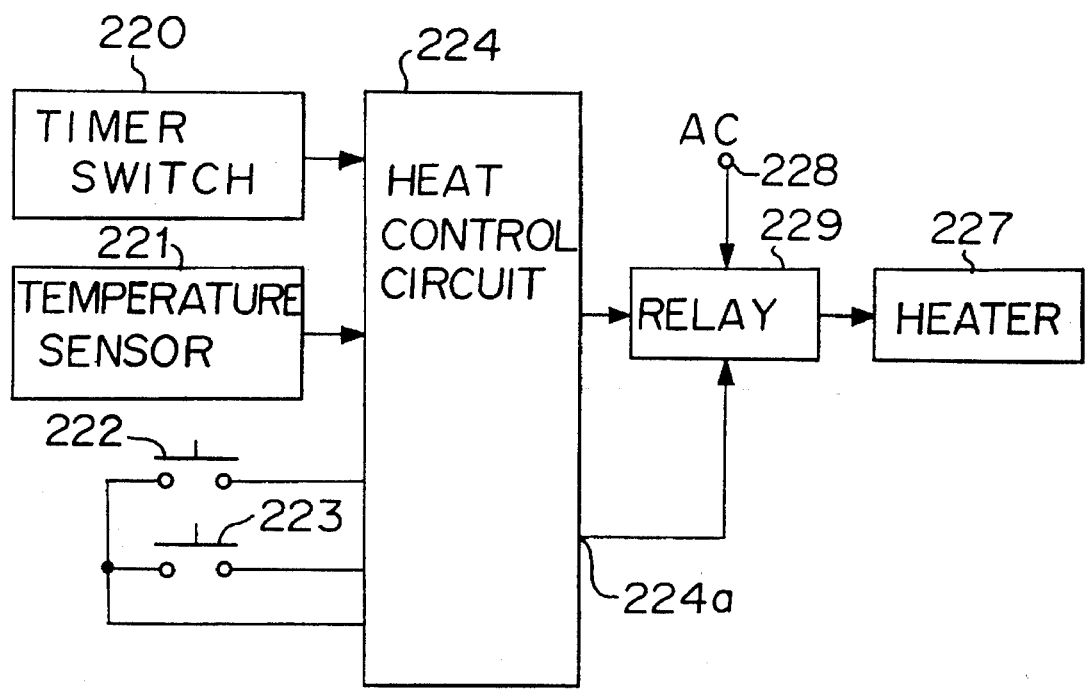
FIG. 6 is a simplified structural view which shows an embodiment of this invention.

FIG. 6 is a block diagram for explaining the heat control of the bread making apparatus in FIG. 5.

The numeral 228 is an input terminal for AC power, 229 is a relay circuit, and 227 is a heat generative portion (heater).

The numeral 220 is a timer switch circuit, 221 is a temperature sensor, 222, 223 are key input circuits and 224 is a heat control circuit portion. Further, 224a is an output terminal of a duty ratio control signal set by the heat control circuit portion 224, which controls the relay circuit 229.

Figure 7:
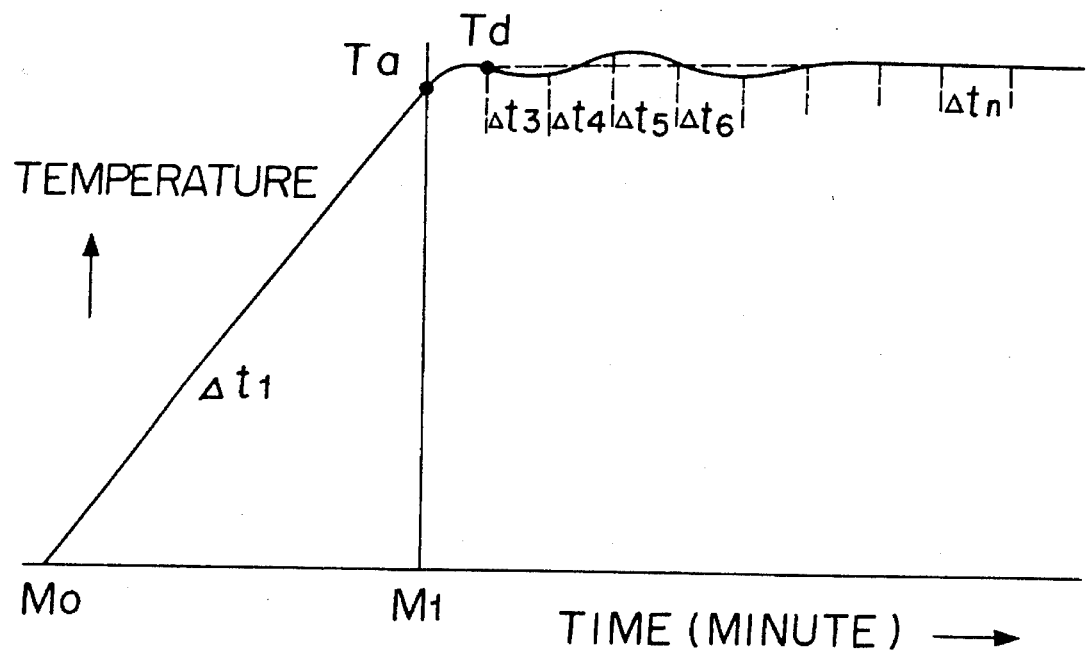
FIG. 7 is a temperature characteristic diagrammatical view of an embodiment of this invention.
Figure 8:
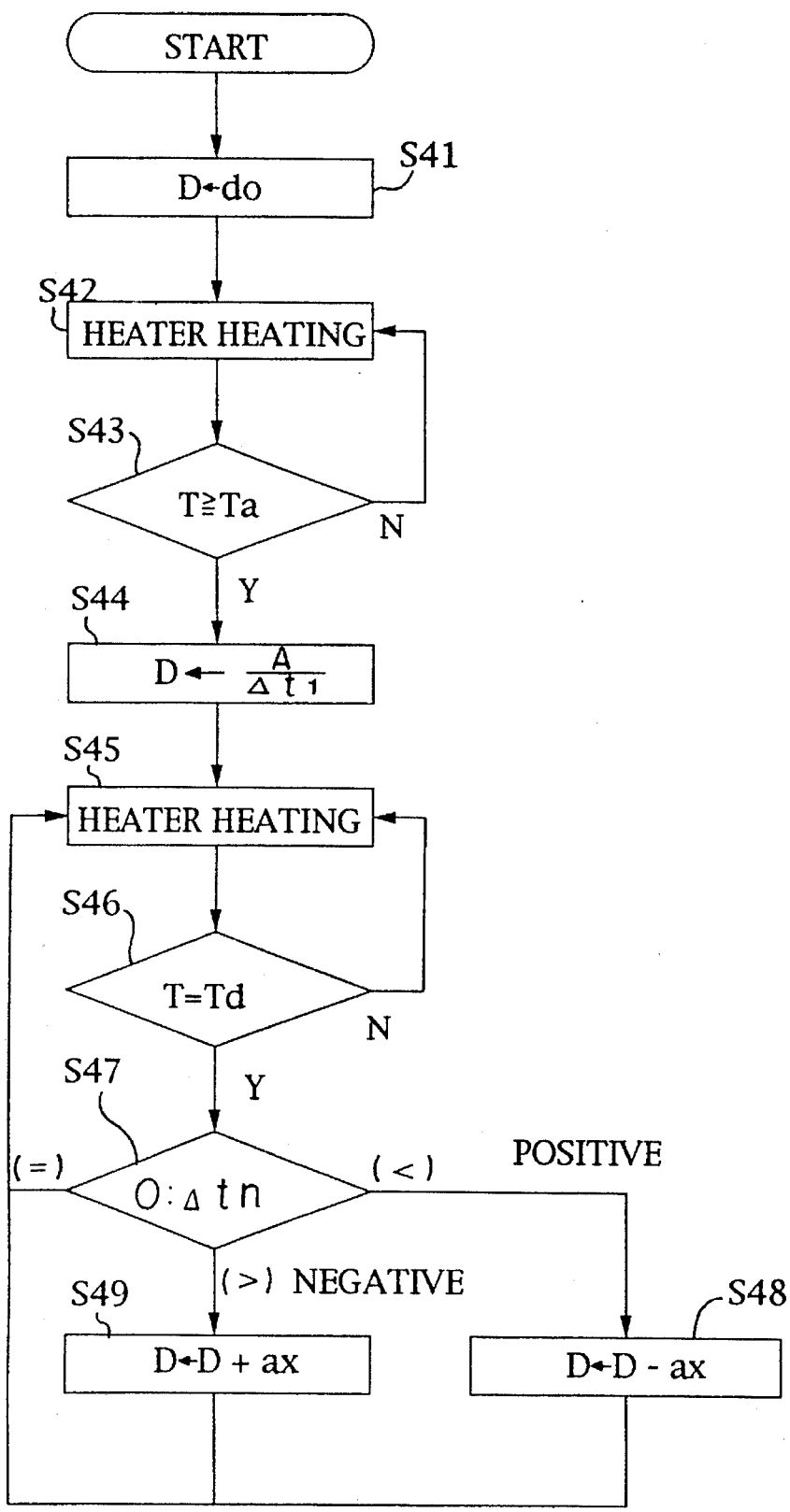
FIG. 8 is a flow chart of a heater heating of an embodiment of this invention.

FIG. 7 and FIG. 8 are, respectively, a temperature change curve and a flow chart which show the temperature change curve of this invention.

The detected signal from the temperature sensor 221 is input to the heat control circuit 224 and its value is memorized temporarily at every interval (wherein the initial interval is decided separately as described hereafter), compared with a previously detected signal value and taken out as a different signal $\Delta t$—as an acceleration of temperature ascent or descent.

In this case, the above interval is decided in view of a response characteristic of the temperature sensor 221 and the like.

The $\Delta T_1$—$\Delta tn$ in FIG. 7 shows each acceleration of the temperature ascent and descent At of each interval, wherein the initial interval is as follows.

Namely, the duty ratio D which controls the above relay circuit 229 is shown by $d_0$ (FIG. 8). This $d_0$ is generally 100% (step S41).

The heat generative portion 227 is heated by duty ratio $d_0$ and its heating continues up to the first set temperature Ta (steps S42, 43). In FIG. 7, the first interval is from $M_0$ moment time to $M_1$ moment time, and the acceleration of the temperature ascent and descent between them is shown by $\Delta T_1$.

The above initial acceleration of temperature ascent and descent $\Delta T_1$ is decided by a capacity of the heat generative portion, a heat capacity of the heating area, a heat maintenance characteristic, a load capacity, the set temperature and the like.

After the above initial heating ($M_0$–$M_1$) is passed, the duty ratio D which controls the above relay circuit 229 is output by 224a output terminal after calculating at the heat control circuit portion 224 as follows.

Namely, a constant A decided by previous experiment is divided by $\Delta T_1$ and the initial duty ratio $D1=A/\Delta T_1$ is obtained (step S44).

In this case, if $\Delta T_1$ is large, D1 becomes small, and if $\Delta T_1$ is small, D1 becomes large.

When $\Delta T_1$ is large, the temperature rises easily and the duty ratio becomes small, and if $\Delta T_1$ is small, the duty ratio becomes large because the temperature rises with difficulty.

Then, the above duty ratio is maintained up to a second set temperature Td and the second interval is completed (step S45, 46).

Then, in the next step S47, an acceleration of temperature ascent and descent $\Delta t_n$ (at first from $\Delta t_3$) in a previous interval is required. This $\Delta tn$ is compared with 0 and if this is 0, the step S47 is moved to S45.

If tn is larger than 0, or the acceleration of temperature ascent, D-ax which is a new duty ratio derived by reducing ax from duty ratio D of the front step interval is output to an output terminal 224a as a new duty ratio.

In this case, x is a minimum value of the duty ratio change and a is a coefficient which is decided based upon the largeness or smallness of the absolute value of the change of $\Delta t_3$–$\Delta t_4$.

If $\Delta tn$ is smaller than 0, or an acceleration of temperature descent, a new duty ratio D+ax which adds ax to the duty ratio D of the interval in the front step sends a control signal to the relay circuit 229 as a new duty ratio.

Thus, the duty ratio D is corrected at each interval and if the interval is repeated up to n steps lastly as shown in FIG. 7, the temperature accesses to the second set temperature $T_2$ gradually, whereby the temperature change of interval between each area can be 0.

As a result, the temperature of the bread making apparatus becomes stable and decreases scorching and uneven baking.

As described above, the temperature control method of a kitchen-heating apparatus in this invention is performed by using the heat kitchen apparatus which is provided with a temperature sensor at a certain place in the heating area and controls the temperature of the heating portion by comparing the temperature detected by the above temperature sensor with the set temperature. In this case, the above temperature of the heating portion is controlled by requiring the acceleration of the temperature ascent at each certain interval and is controlled with a duty ratio which corrects the duty ratio at the above heating portion of each interval with the acceleration of temperature ascent and descent at the front step thereof. Accordingly, the temperature control to the heating portion of the heating kitchen apparatus can be more obtained stably compared to the conventional method.

Another temperature control method different from the above bread making apparatus will be described as follows.

Although the kitchen-heating unit of this embodiment is the same as the bread making apparatus in FIG. 5, the following description regarding the embodiment consists of constructions and actions unique to this invention.

Figure 9:
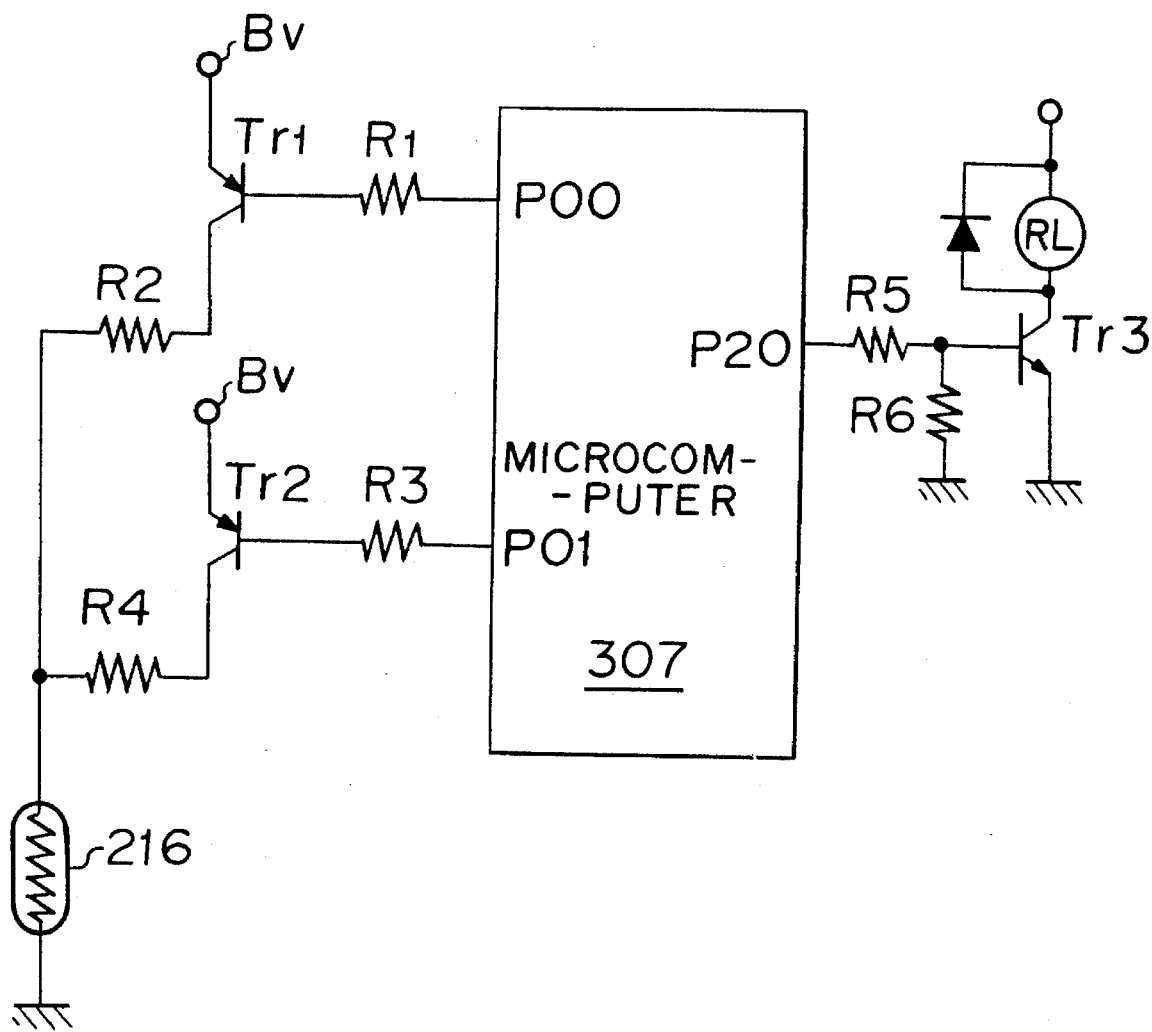
FIG. 9 is a view which shows the primary elements of a temperature control unit according to this invention.

As shown in FIG. 9, a temperature sensor 216 comprising a thermistor is connected to input port $P_{00}$, $P_{01}$ of the microcomputer 307 in the control unit through resistances $R_1$, $R_2$, transistors $Tr_1$, $Tr_2$ and resistances $R_3$, $R_4$ respectively. $B_v$ is a standard voltage, and is 5 volts in this embodiment.

The reason that 2 ports $P_{00}$, $P_{01}$ are used is because the volts input to each port $P_{00}$, $P_{01}$ can be adapted to be different by changing the resistant values of $R_1$ to $R_4$.

In other words, even when the ranges are different in resistant value of the sensor 216, temperatures of different ranges can be measured by changing the $P_{00}$, $P_{01}$ with one sensor 216 without changing the data of the lookup table (described hereafter) in the microcomputer 307 by keeping the input voltage to each Port, $P_{00}$, $P_{01}$ at the same level.

Namely, when the resistance value of the temperature sensor 216 changes, the voltage added to the input Port $P_{00}$, $P_{01}$ changes, and this voltage is digitized in the microcomputer 307, whereby the temperature detected by the temperature sensor 216 is judged by referring to the lookup table described hereafter.

In the following description, only that regarding the input port $P_{00}$ will be described.

To the output port $P_{20}$ of the microcomputer 30 is connected a relay RL for heater control through the resistances $R_5$, $R_6$ and the transistor $Tr_3$. The heater 207 turns on/off by the on/off of the signal output from the output port $P_{20}$.

Further, the ROM in the microcomputer 307 is provided with a lookup table in which each voltage value of the input port $P_{00}$ corresponds to each temperature of the temperature sensor 216 and each digital value divided into 256 bits of each voltage value are recorded as shown in FIG. 11.

Namely, for instance, when 0.405 volts are applied to the input port $P_{00}$, this voltage value is a digital value [15] by A/D conversion and the detected value of the present temperature sensor 216 is recognized as [15] by microcomputer 307. However, the true detected temperature of the sensor is 217° C.

Therefore, according to this table, when the temperature nears the temperature sensor 216 rises at the time the heater is on, the digital value recognized by the microcomputer 307 changes [1C] [1B] [1A]–[16] [15] in order.

In this embodiment, an incorporating action of the voltage value of the input Port $P_{00}$ by the microcomputer 307 accepts each data 3 times at short intervals at a few microseconds per each one time in order to detect mountain peaks (upper peaks) and valley peaks (down peaks) of the temperature data described hereafter.

Figure 10:
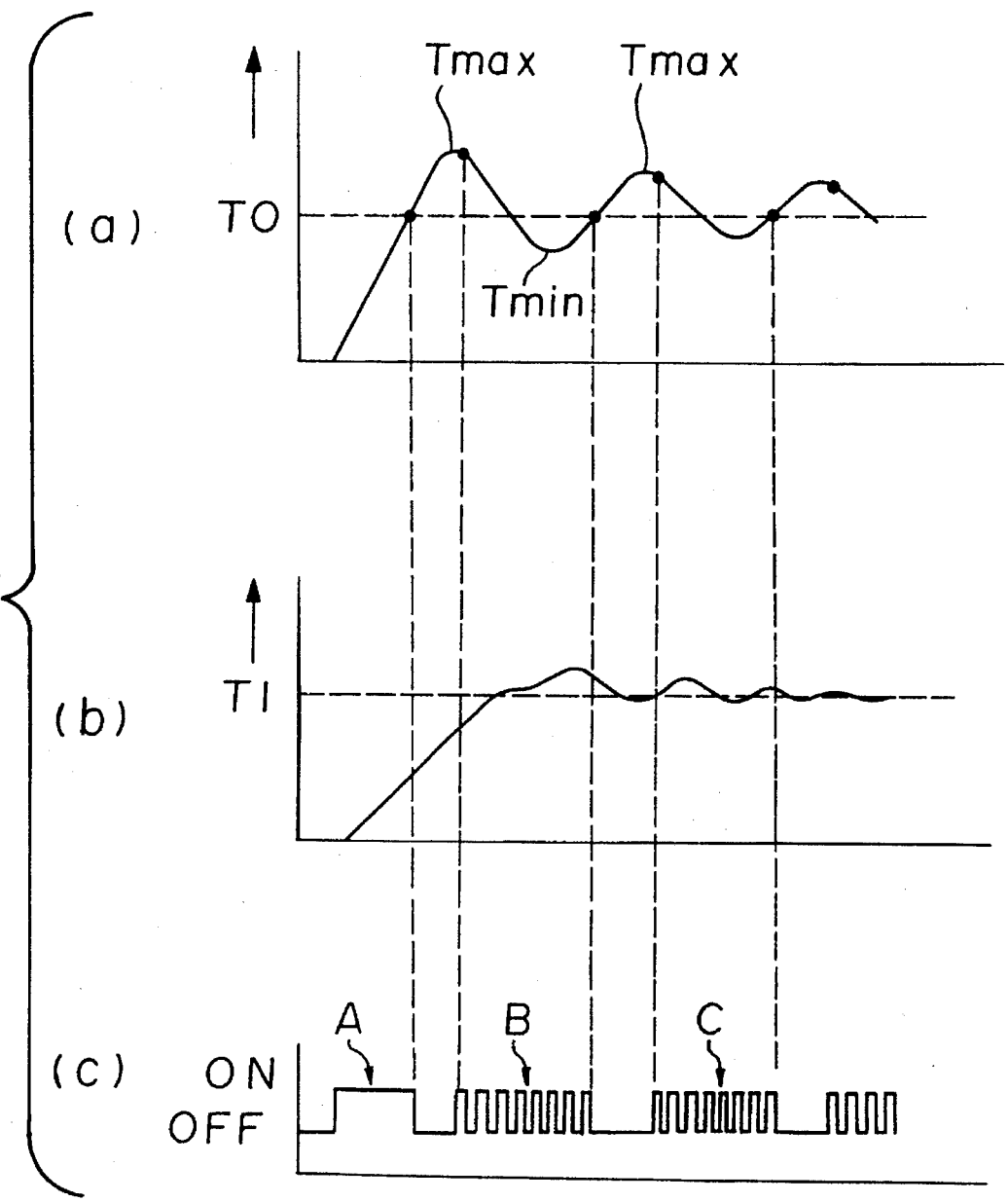
FIG. 10 shows parameter relationship in a temperature control unit according to this invention.
Figure 12:
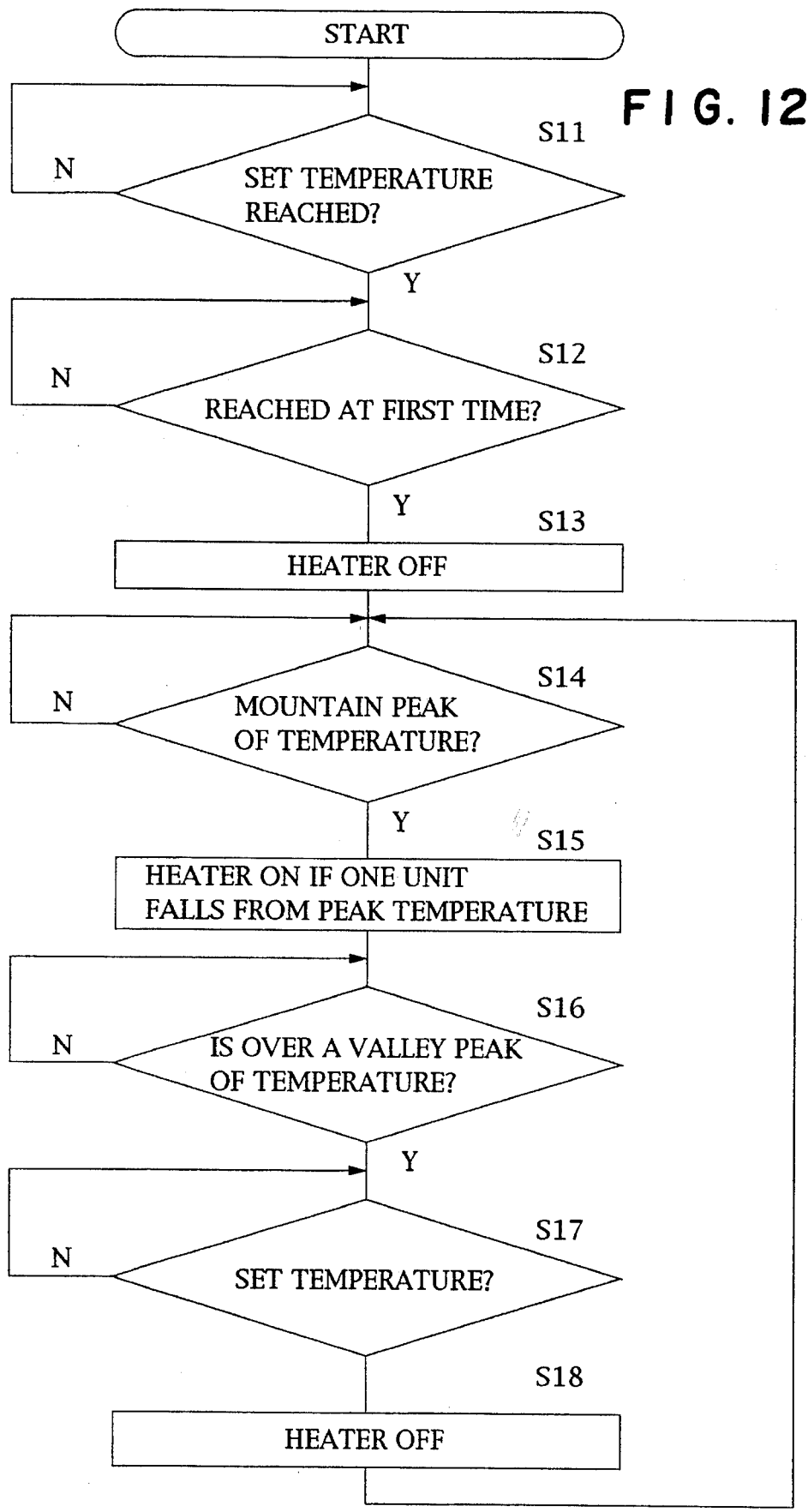
FIG. 12 is a flow chart which shows a method of an embodiment according to this invention.

Next, the control operation of this embodiment will be described based upon the flow charts in FIG. 12 and FIG. 10.

Although the kneading temperature of the dough and the fermenting temperature in the bread making apparatus are comparatively low, such as about 28° C., then the step thereof enters into a baking step, the heater 207 is continuously on (arrow A in FIG. 10(c)) and the temperature in the baking oven rises rapidly whereby the detecting temperature by sensor 216 rises suddenly.

Even in this time, the microcomputer 307 accepts the detected temperature of the sensor from the input data of the input port $P_{00}$ or $P_{01}$ as a digital value.

In this embodiment, the objective temperature $T_1$ in the baking oven is 150° C. and the set value $T_0$ of the sensor detected temperature corresponding to this objective temperature $T_1$ is 180° C.

When the sensor detected temperature reaches the set value $T_0$ (S11), whether or not this is the first time the value is reached is judged (S12), and if it is the first time, the heater turns off (S13).

Even by this sensor, the sensor detecting temperature continues rising over the set value $T_0$ for a while and then descends after that.

The microcomputer 307 detects (S14) this changing point of time to the descent by the flow (FIG. 13) described hereafter. After this turning point to the descent (upper peak of the temperature) is passed, if the temperature decreases by one unit from the sensor detecting temperature at this turning point (becomes 1 bit larger at the digital value in the table), the heater comes on again (S15). Although the change of 1 bit generally occurs instantly, this establishment can be an arbitrary bit more than 2 bits and other than 1 bit.

In this case, the heater in the "on" condition has a so-called duty ratio (arrow B of FIG. 10(c)).

In this embodiment, though the duty ratio which repeats 4 seconds on and 6 seconds off is adopted, an arbitrary duty ratio can be also adopted by changing the timer set-up as described hereafter.

Although the case is heated again by the heater coming on, the sensor detecting temperature does not turn to ascend immediately. After continuing to descend for a while, the rising occurs through the down peak of the temperature (S16), and at the point of time of reaching the set temperature $T_0$ again (S17) the heater comes on (S18).

The sensor detecting temperature does not turn to descend immediately even by the heater being off, but turns to descend together with a time lag. Accordingly, after detecting an upper peak the second time (S14), the heater comes on again at the time when the temperature falls down by one unit from the temperature of the detecting time (S15).

This heater "on" instruction after the second time (arrow c of FIG. 10(c)) is also duty control.

The details of the above step (particularly, the step which detects the upper peak of the temperature and the step of duty heating) will be described by another flow chart.

Figure 13:
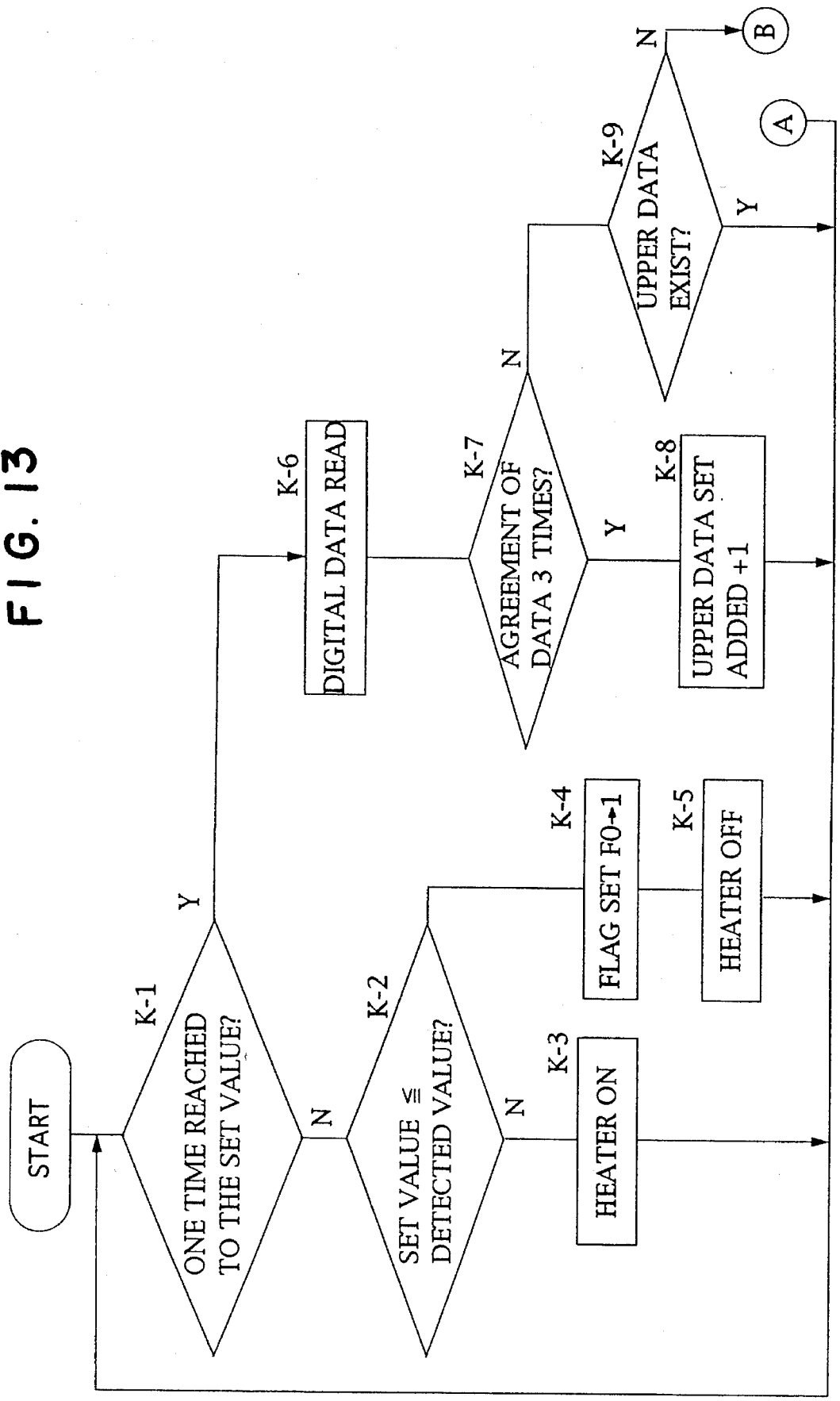
FIG. 13 is a flow chart (chiefly a control portion of a temperature peak of the same).
Figure 14:
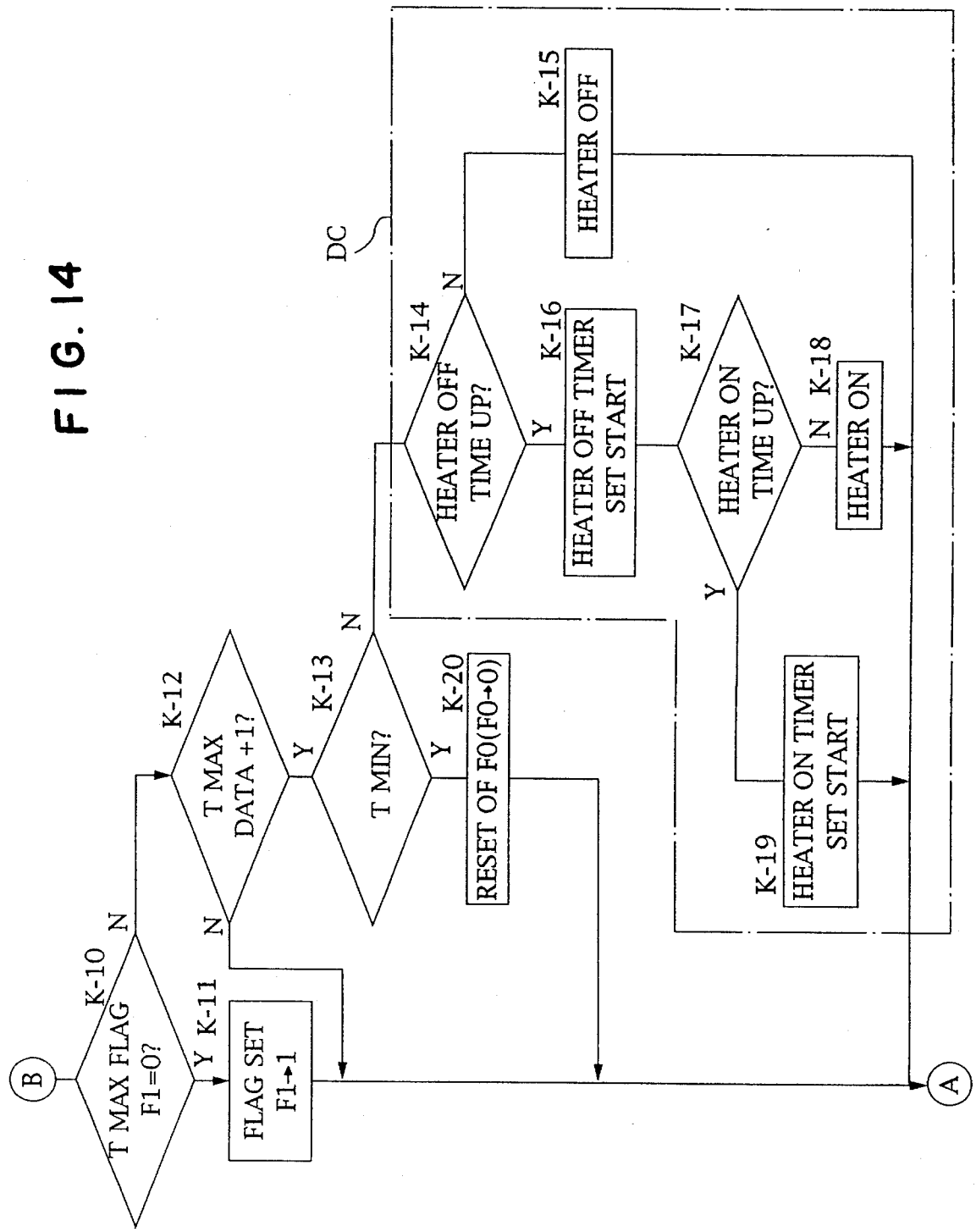
FIG. 14 is a flow chart of the same (chiefly a control portion of a duty heating).

In other words, this flow is shown by FIG. 13 and FIG. 14.

Although a flag F0 and a flag 1 are used in this flow chart, the flag F0 is a flag which becomes [1] when the detected temperature reaches the set temperature $T_0$, while flag F1 is a flag which becomes [1] when the detected temperature reaches the peak (Tmax).

First, in the flow chart in FIG. 13, whether the sensor detecting temperature reaches the set temperature $T_0$ or not is judged (K1), and if not, it is further judged whether the detected temperature is larger than the set temperature $T_0$ (K2). If the detected temperature is still smaller than the set value $T_0$, the heater is kept on so as to continue heating (K3).

In the above step (K2), when the detected temperature is judged to be larger, the above flag F0 becomes (K4) and the heater turns off (K5).

This step is equivalent to step (S13).

In the step (K4), if the flag F0 is set, since the set temperature is judged to reach its set value in step (K1), the detected temperature of the digital data is read 3 times continuously as described above (K6).

The 3 read data generally becomes the same data since the interval of read time for 3 times is very short (e.g., [1a] [1a] [1a]). However, in a step wherein the temperature rises rapidly or a step wherein the temperature is just over the peak, a case wherein 1 or 2 data are different from other data occurs (e.g. [16] [16] [15] or [17] [16] [17]).

In order to detect the point in time where the temperature is over the peak, it is desirable to be detected that the data is arranged in the above latter form. Accordingly, whether or not the data of 3 times agree with one another is judged (K7), and if data of 3 times are the same, a reference data in RAM is moved up by one bit (K8).

If the data of 3 times do not agree, it is judged whether or not the data moved up by one bit exist in the data of 3 times (K9).

For instance, if the detected data [16] [16] [16], [15] is memorized in the RAM of the microcomputer as a reference data, and if the next read data of 3 times is e.g., [16] [16] [15], the former data exists.

In this case, since the detected data is still rising, it returns to step (K1) again. Then, if the data read 3 times is e.g., [16] [17] [17], the former data does not exist and since the detected temperature shows a descent, this is judged as a temperature peak and is transferred to a flow of FIG. 14 to turn the heater on.

In the flow chart of FIG. 14, in step (K10), it is judged whether or not the above flag F1 is becoming [1]. Since, in general, the initial is zero (0), the next step (K1) becomes [1] to flag F1 If the flag F1 is becoming [1], the next step (K10) judges as [no] and the next judgement is performed in step (K12). Further [Tmax] is a digital value (the above example is [16]) at the point of time where the temperature is judged to be a peak in the above step (K12).

In other words, in step (K12), whether or not the present detecting data is larger by more than 1 bit than the above [Tmax] is judged. If it is [no], it is transferred to flow chart A in FIG. 13 If it is [yes] (in a case where the detected temperature comes down slightly from the peak temperature) whether or not the temperature is the lower peak is judged at step (K13) continuously. If it does not reach the down peak, it is transferred to the heater "on" control (DC) having a certain duty ratio.

In the heater "on" routine, the heater's "on" timer is set at 4 seconds and the heater's "off" timer is set at 6 seconds.

Accordingly, when this heater "on" control is set (DC) (from step K14 to K19), the duty heating of 4 seconds heater "on" and 6 seconds heater "off" is practiced (arrow marks B and C in FIG. 10(c)).

Further, as described above, the set time of the above heater "on" timer and heater "off" timer can be set arbitrarily by microcomputer. Accordingly, it is easy to change the above duty ratio.

By changing the duty ratio to a heater "on" time having a large proportion, the heating is performed rapidly without relation to the original watt volume of the heater. Accordingly, although the descent inclination of the sensor detecting temperature can be decreased to a small inclination, since the amount of the remaining heat becomes larger the restration of the temperature ascent after the temperature rises in the next step becomes difficult.

On the contrary, when the duty ratio is changed to a larger side of the heater time, the heating becomes slow and becomes lower than that of the bottom at the time of the sensor detecting temperature. However, the control of the temperature ascent after conversion of the temperature to rising becomes easy.

Figure 16:
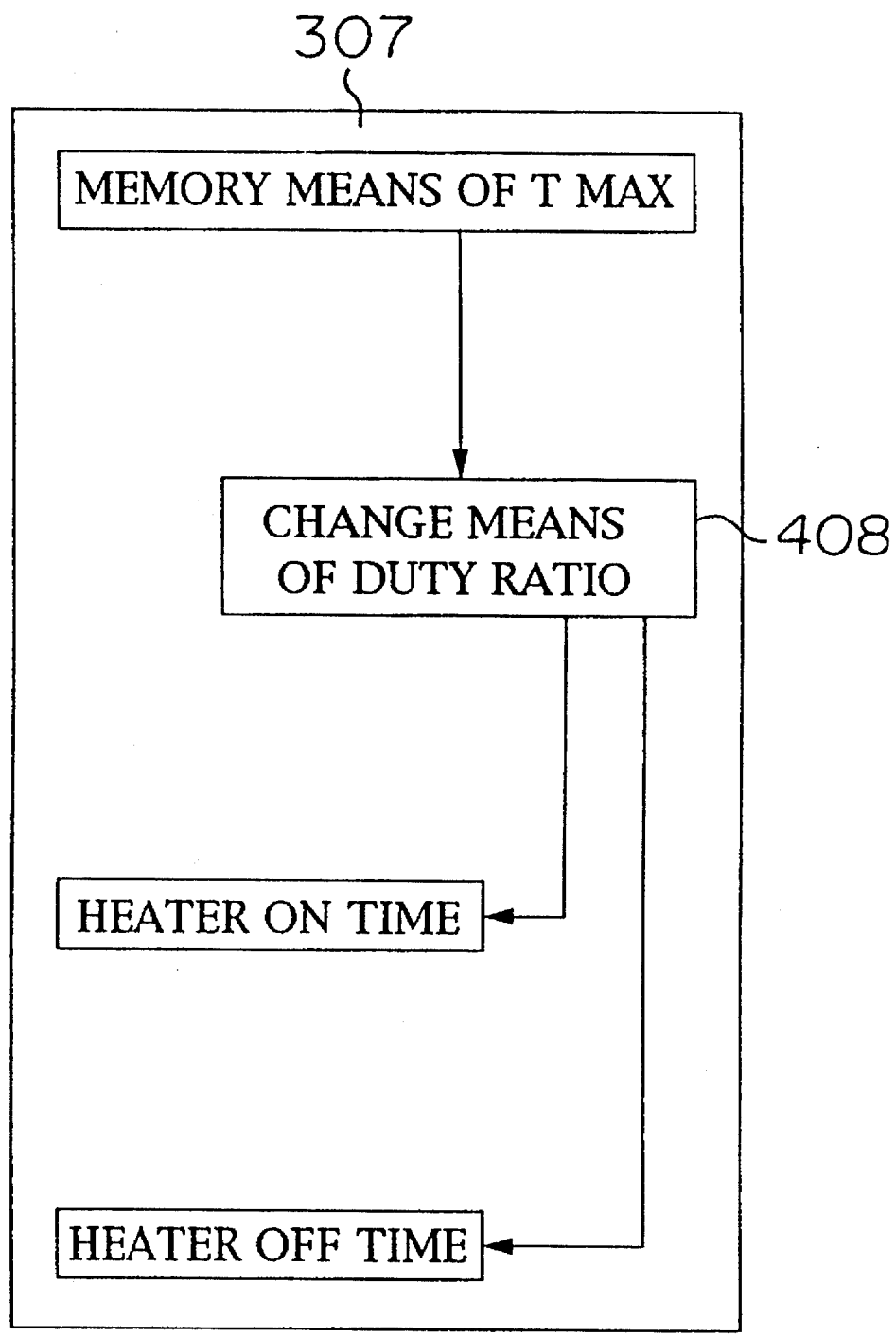
FIG. 16 is a view which shows block construction in a microcomputer when a duty ratio is changed by the height of the peak temperature.

In view of the above conditions, if the above [Tmax] is a higher temperature, or a comparatively lower temperature, a change means of the duty means 408 which changes the duty ratio to a longer heater "on" time ratio or a shorter heater "on" time ratio respectively, may be provided in the microcomputer 307 (FIG. 16).

In any case, when the duty heating continues as described above, the descent of the detected temperature comes to the end at a certain point (e.g., 140° C.) and the temperature of the valley peak is detected in step (K13). If this peak is detected, the above flag F0 is reset to [0] in the next step (K20).

After further successive duty heating, when the detected temperature is over the set temperature (step K2), the flag F0 turns [1] again (step K4) and the heater goes off (step K5).

In the above description, the duty heating is initiated soon after the mountain peak of the temperature is detected, and afterward, at the point of time where the temperature once comes to the lowest bottom and rises again to reach the set temperature, the control is stopped. However, the stop point of time of the duty heating may be preferable soon after detection of the valley peak (down peak).

Figure 15:
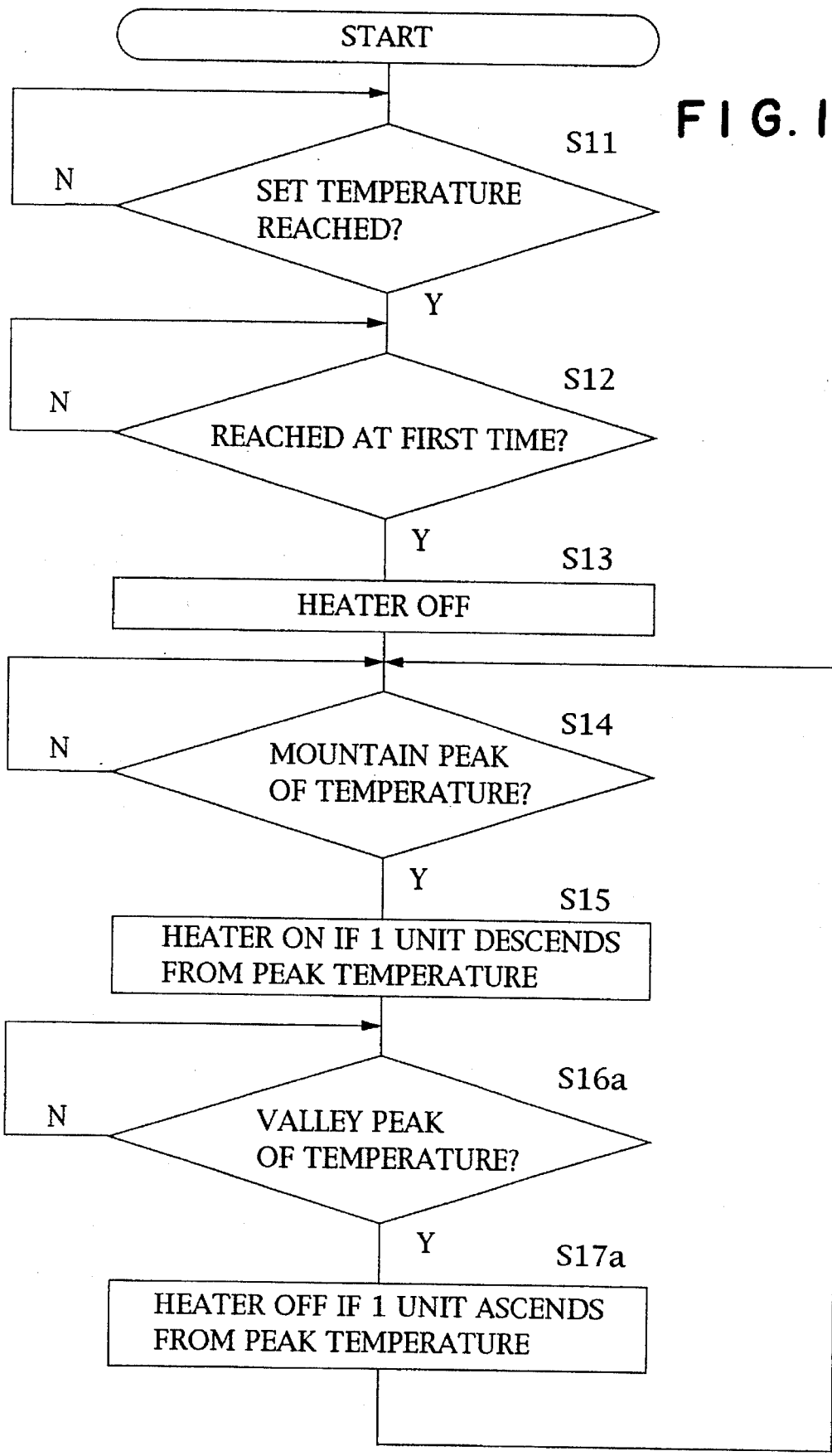
FIG. 15 is a flow chart which shows another embodiment method.

The flow chart in this case is explained by FIG. 15.

The difference in the flow charts between FIG. 15 and FIG. 14 is the difference between S16a and S17a. In step S16a, it is judged whether or not the detected temperature has reached the valley peak. If "yes", the heater turns off at the point in time where the detected temperature data rises by 1 bit unit more than the detected temperature of the peak time of the valley.

The detection of valley peak of the detecting time is performed by the same flow as the flow chart in FIG. 13. As an upper data, the value wherein the digital value is −1 may be used as reference data.

The heater "off" timing in step S17a is a point in time wherein the digital value of the detecting data is a value smaller by 1 bit than the digital value of the peak time of the valley. However, this 1 bit smaller can be changed to arbitrary bits more than 2 bits.

In any case, when the above control is performed, the amplitude of the sensor detecting temperature decreases gradually as shown in FIG. 10(a), and the temperature in the baking oven is also gradually converged to the objective temperature $T_1$.

Particularly in kitchen devices in which it is necessary to change the objective temperature rapidly from a comparatively low temperature in the kneading and fermenting steps to a high temperature in the baking step as in the automatic bread making apparatus, temperature overshoot is apt to occur frequently when the apparatus is allowed to rise to a high temperature. However, in the control method of this invention, such an overshoot is sufficiently decreased.

As described above, in the temperature control method according to this invention, the temperature in the heating kitchen case can be decreased as small as possible toward the objective temperature.

What we claim is:

1. Bread making apparatus comprising a case; an oven heater within said case; heater control means for enabling and disabling said heater in accordance with a stored preset baking time setting; on-off cycle detecting means for detecting when said heater is enabled and disabled by the passing of current through said heater; and master control means for sequentially performing kneading, fermenting and baking of bread materials placed within said case, said master control means automatically controlling baking as a function of the on/off cycle information detected by said detecting means and said preset baking time to change said preset baking time as a function of the on/off cycle and terminating current flow to said heater when the baking time exceeds said stored preset baking time.

2. A method of controlling the temperature in a bread making apparatus having a bread heating area heated by a heating element and a temperature sensor for sensing the temperature in the bread heating area, the method comprising the steps of comparing the temperature detected by said sensor with a stored predetermined set temperature value; controlling the temperature of said heating area by heating said heating element with an on/off heating cycle which is at least partially determined by said detected and set temperature values, the temperature of said heating area being controlled by adjusting the length of said on/off heating cycle of successive on/off heating cycles to reduce successive temperature fluctuations within said heating area.

3. A method of controlling the temperature in a bread making apparatus having a bread heating area heated by a heating element and a temperature sensor for sensing the temperature in the bread heating area, the method comprising the steps of heating said heating element by selective on/off control of said heating element to control the duty cycle of said heating element to cause the sensed temperature within said heating area to fluctuate above and below a stored predetermined set value; turning off said heating element at a turn-off when the temperature within said heating area is increasing and becomes equal to approximately said set value; and turning said heating element on at a turn-on point when said sensed temperature begins to decrease but before said sensed temperature becomes equal to approximately said set value.

4. Method as defined in claim 3, wherein said heating element is operated intermittently on and off following said turn-on points.

5. A breadmaking apparatus provided with a breadmaking case and an oven heater continuously performing each of processes such as kneading, fermenting and baking in each of specified standard times by putting bread materials therein, said breadmaking apparatus comprising and on/off cycle detecting means for detecting on/off cycle for current flow of said oven heater;

a judging means for judging whether the detected number of said on/off cycle by said detecting means is above said specified standard times or lower; and a baking time control means for changing said standard time for baking when baking according to said judged result.

6. In a temperature control method performing control of the heating portion of a breadmaking apparatus provided with a temperature sensor in the specified portion of a heating zone, performing control of said heating portion while comparing said detected temperature by said temperature sensor with the specified temperature at every specified interval, said temperature control method applied to a breadmaking apparatus of the like characterized in that the acceleration of the temperature rise at every specified interval is measured, and the temperature of said heating portion is controlled by the duty ratio compensated by the value of the acceleration of the temperature rise in said prior placed interval with the duty ratio between on time of the current on/off process of said oven heater at said every interval.

7. A temperature control method of a breadmaking apparatus wherein the temperature in a kitchen-heating portion is detected by a sensor and brings its temperature to the objective temperature by the on/off control of a heater which heats the inner kitchen case according to said detected value, said temperature control method being characterized in that the ascent of the sensor detecting temperature due to the heater being on detects the point of time where the temperature turns to descend together with a time lag due to the sensor being off thereafter, and after the point of time and at an earlier point in time than a point where at least the sensor detecting temperature falls to the set value of the sensor detecting temperature corresponds to the objective value of the inner temperature of above kitchen case, the heater turns on again.

8. A temperature control method of a breadmaking apparatus according to claim 7, wherein a point of time where the sensor detecting temperature turns to descend together with a time lag due to the above heater being off is detected and the heater is on again soon after said point of time.

9. A temperature control method of a breadmaking apparatus according to claim 8, wherein after detection of the point of time where the above sensor detecting temperature turns to descend together with a time lag, a current flow state of the heater which is on again in an intermittent on state which repeats on and off alternately in accordance with the specified duty ratio.

* * * * *